United States Patent
Norimatsu

(10) Patent No.: US 12,170,934 B2
(45) Date of Patent: Dec. 17, 2024

(54) INFORMATION PROCESSING APPARATUS, INFORMATION PROCESSING METHOD, AND STORAGE MEDIUM

(71) Applicant: NEC Corporation, Tokyo (JP)

(72) Inventor: Koui Norimatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 17/416,855

(22) PCT Filed: Dec. 26, 2019

(86) PCT No.: PCT/JP2019/051265
§ 371 (c)(1),
(2) Date: Jun. 21, 2021

(87) PCT Pub. No.: WO2020/138349
PCT Pub. Date: Jul. 2, 2020

(65) Prior Publication Data
US 2022/0060851 A1 Feb. 24, 2022

(30) Foreign Application Priority Data
Dec. 27, 2018 (JP) .................. 2018-244810

(51) Int. Cl.
*G07C 9/25* (2020.01)
*G06V 20/52* (2022.01)
(Continued)

(52) U.S. Cl.
CPC ............ *H04W 4/024* (2018.02); *G06V 20/52* (2022.01); *G06V 40/172* (2022.01); *G06V 40/20* (2022.01); *G06V 40/50* (2022.01); *G07C 9/253* (2020.01)

(58) Field of Classification Search
CPC ...... G06V 20/52; G06V 40/172; G06V 40/20; G07C 9/253
See application file for complete search history.

(56) References Cited

U.S. PATENT DOCUMENTS

| 2003/0107472 | A1 | 6/2003 | Ogihara et al. |
| 2013/0179957 | A1* | 7/2013 | Takata ................ H04L 9/3231 726/7 |

(Continued)

FOREIGN PATENT DOCUMENTS

| CN | 1426015 A | 6/2003 |
| CN | 102867277 A | 1/2013 |

(Continued)

OTHER PUBLICATIONS

International Search Report for PCT Application No., PCT/JP2019/051265, mailed on Feb. 10, 2020.

(Continued)

*Primary Examiner* — Nabil H Syed
(74) *Attorney, Agent, or Firm* — Sughrue Mion, PLLC

(57) ABSTRACT

Provided are an information processing apparatus, an information processing method, and a storage medium that can efficiently perform an immigration examination. The information processing apparatus includes: an examination unit that, based on user information acquired from a user who completed a departure examination of a first country but has not started boarding for a second country and related to the user, performs an immigration examination of the second country; and a transmission unit that transmits a notification related to the immigration examination.

19 Claims, 18 Drawing Sheets

(51) Int. Cl.
  *G06V 40/16* (2022.01)
  *G06V 40/20* (2022.01)
  *G06V 40/50* (2022.01)
  *H04W 4/024* (2018.01)

(56) References Cited

U.S. PATENT DOCUMENTS

| | | | |
|---|---|---|---|
| 2015/0193898 A1 | 7/2015 | Huruli et al. | |
| 2015/0317853 A1* | 11/2015 | Reymann | G07C 9/20 340/5.7 |
| 2016/0110585 A1 | 4/2016 | Govindaraj et al. | |
| 2019/0104377 A1* | 4/2019 | Nilsson | G06T 19/006 |
| 2019/0362572 A1* | 11/2019 | Amuduri | G07C 9/27 |
| 2020/0234389 A1 | 7/2020 | Nakashima et al. | |

FOREIGN PATENT DOCUMENTS

| | | |
|---|---|---|
| CN | 102959590 A | 3/2013 |
| CN | 109087068 A | 12/2018 |
| EP | 3261059 A1 | 12/2017 |
| EP | 3407291 A1 | 11/2018 |
| JP | 2003178346 A | 6/2003 |
| JP | 2007179475 A | 7/2007 |
| JP | 2007249819 A | 9/2007 |
| JP | 2012088944 A | 5/2012 |
| JP | 2015222459 A | 12/2015 |
| JP | 2016053896 A | 4/2016 |
| JP | 2017182388 A | 10/2017 |
| JP | 2018-045340 A | 3/2018 |
| JP | 6437167 B1 | 12/2018 |
| KR | 10-2010-0130832 A | 12/2010 |
| KR | 10-2016-0120482 A | 10/2016 |
| WO | 2012053242 A1 | 4/2012 |
| WO | 2016/028142 A1 | 2/2016 |
| WO | 2019225550 A1 | 11/2019 |

OTHER PUBLICATIONS

English translation of Written opinion for PCT Application No. PCT/JP2019/051265, mailed on Feb. 10, 2020.
Extended European Search Report for EP Application No. 19903280.6 dated on Jan. 21, 2022.
EP Office Communication for EP Application No. 19903280.6 mailed on Nov. 11, 2022.
CN Office Action for CN Application No. 201980086693.1, mailed on Oct. 27, 2023 with English Translation.
KR Office Action for KR Application No. 10-2021-7019417, mailed on Dec. 14, 2023 with English Translation.
Australian Office Action for AU Application No. 2023203252 mailed on Mar. 19, 2024.
CN Office Action for CN Application No. 201980086693.1, mailed on Jul. 31, 2024 with English Translation.

* cited by examiner

INFORMATION PROCESSING APPARATUS, INFORMATION PROCESSING METHOD, AND STORAGE MEDIUM

This application is a National Stage Entry of PCT/JP2019/051265 filed on Dec. 26, 2019, which claims priority from Japanese Patent Application 2018-244810 filed on Dec. 27, 2018, the contents of all of which are incorporated herein by reference, in their entirety.

TECHNICAL FIELD

The present invention relates to an information processing apparatus, an information processing method, and a storage medium.

BACKGROUND ART

Patent Literature 1 discloses an immigration examination system in which a passenger inputs scheduled immigration information at a passenger information input terminal before departure. In the immigration examination system disclosed in Patent Literature 1, information on an expected entrant and a list of persons under surveillance are matched to determine whether or not a passenger is a person listed in the list of persons under surveillance, and if the passenger is not a person listed in the list of persons under surveillance, the passenger is determined as a subject of an automated gate.

CITATION LIST

Patent Literature

PTL 1: Japanese Patent Application Laid-open No. 2015-222459

SUMMARY OF INVENTION

Technical Problem

In the immigration examination system disclosed in Patent Literature 1, passenger's biometric information is not included in scheduled immigration information input before departure, and the passenger is required to get his/her biometric information read by a biometric information reading device that is a peripheral device of an automated gate after arrival. Thus, in the immigration examination system disclosed in Patent Literature 1, it is difficult to efficiently perform an immigration examination.

In view of the problem described above, the example object of the present invention is to provide an information processing apparatus, an information processing method, and a storage medium that can efficiently perform an immigration examination.

Solution to Problem

According to one example aspect of the present invention, provided is an information processing apparatus including: an examination unit that, based on user information acquired from a user who completed a departure examination of a first country but has not started boarding for a second country and related to the user, performs an immigration examination of the second country; and a transmission unit that transmits a notification related to the immigration examination.

According to another example aspect of the present invention, provided is an information processing method including: based on user information acquired from a user who completed a departure examination of a first country but has not started boarding for a second country and related to the user, performing an immigration examination of the second country; and transmitting a notification related to the immigration examination.

According to yet another example aspect of the present invention, provided is a storage medium storing a program that causes a computer to perform: based on user information acquired from a user who completed a departure examination of a first country but has not started boarding for a second country and related to the user, performing an immigration examination of the second country; and transmitting a notification related to the immigration examination.

Advantageous Effects of Invention

According to the present invention, the time required for an immigration examination can be sufficiently reduced.

DESCRIPTION OF EMBODIMENTS

One Example Embodiment

An information processing system, an information processing apparatus, and an information processing method according to a first example embodiment of the present invention will be described with reference to FIG. 1 to FIG. 17.

Figure 1:
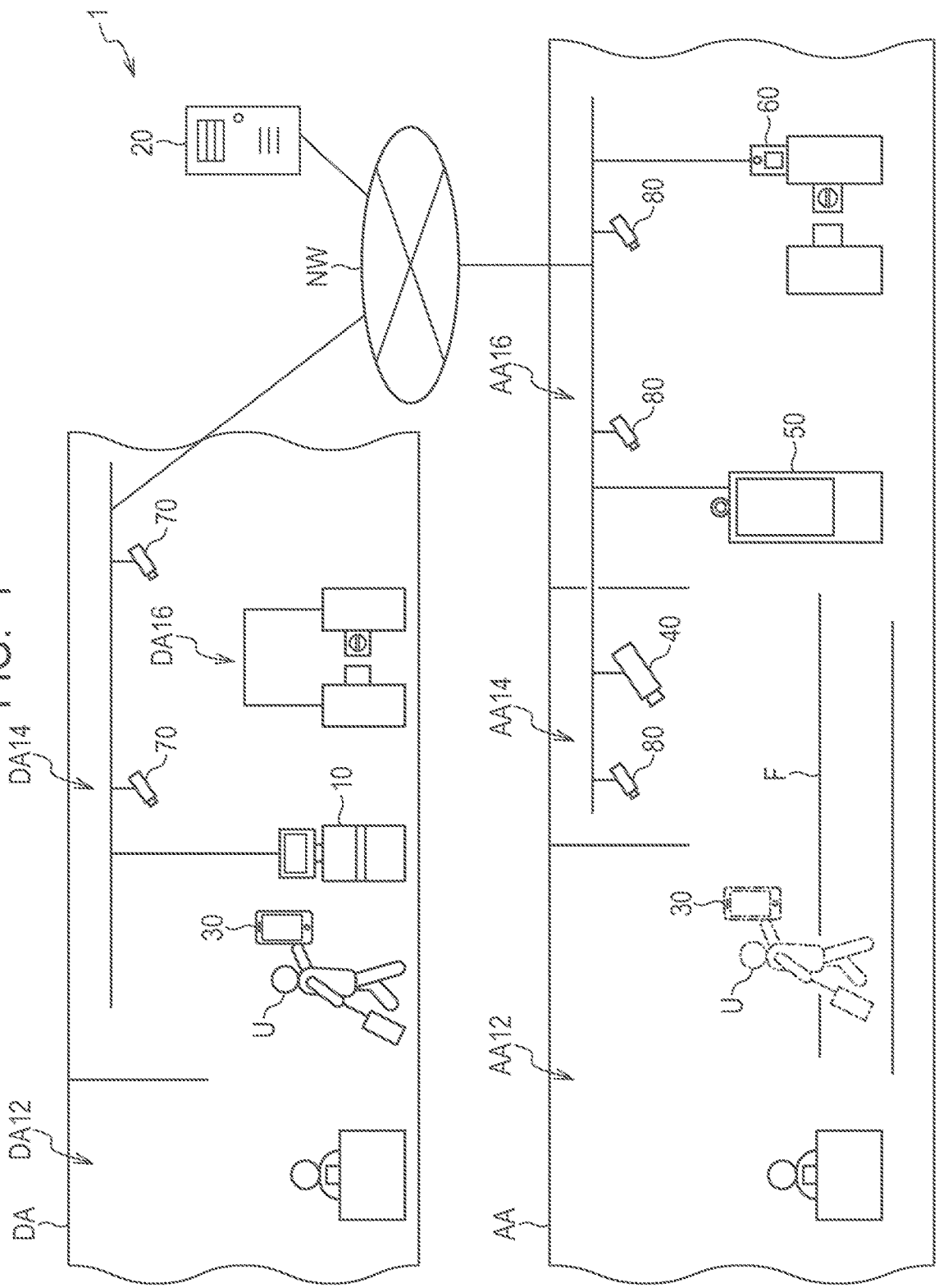
FIG. 1 is a schematic diagram illustrating an overall configuration of an information processing system according to one example embodiment of the present invention.
Figure 2:
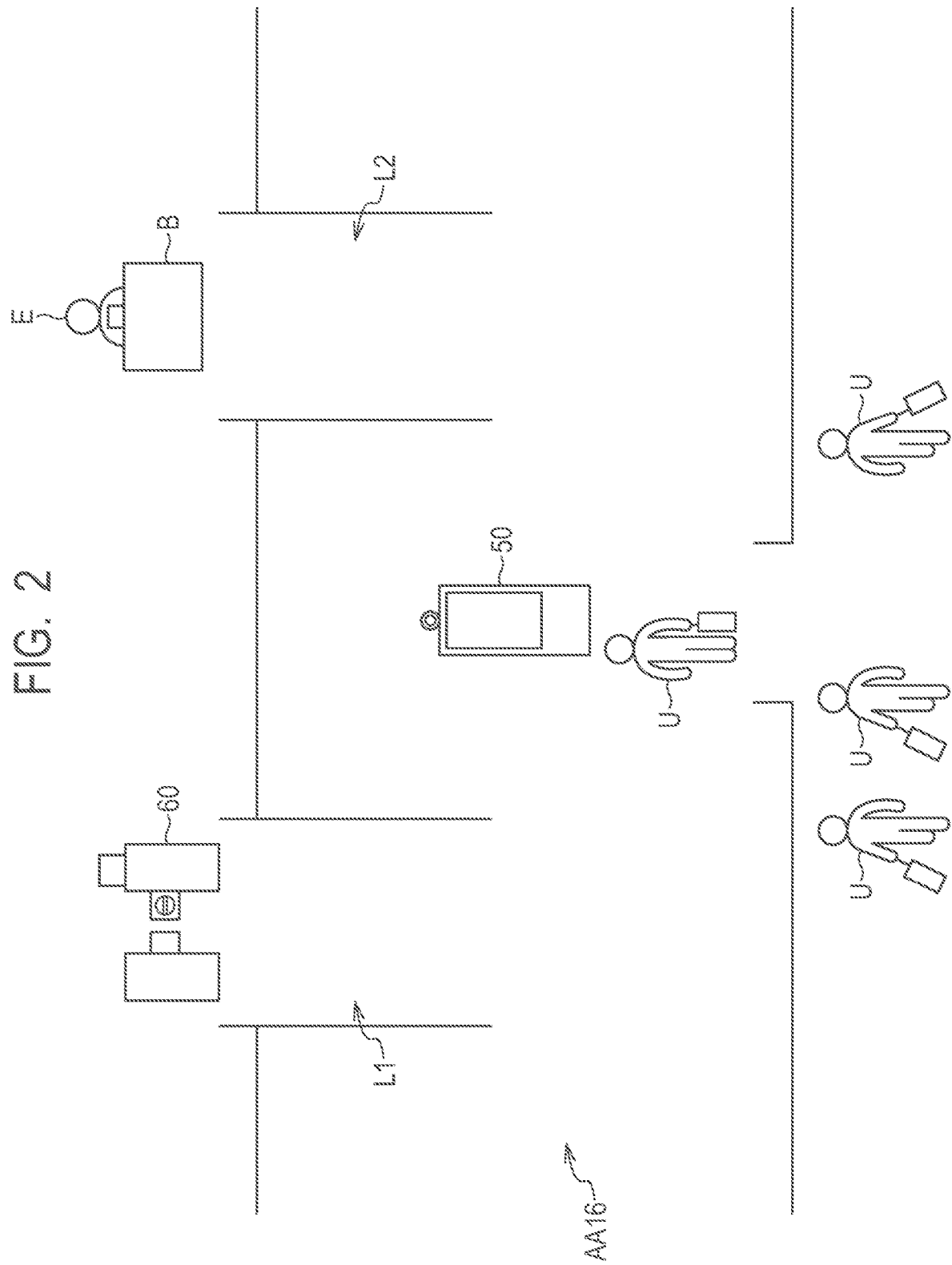
FIG. 2 is a schematic diagram illustrating an immigration examination site in which an automated gate apparatus and a face-to-face examination booth are installed.

First, the configuration of the information processing system according to the present example embodiment will be described with reference to FIG. 1 and FIG. 2. FIG. 1 is a schematic diagram illustrating an overall configuration of the information processing system according to the present example embodiment. FIG. 2 is a schematic diagram illustrating an immigration examination site in which an automated gate apparatus and a face-to-face examination booth are installed.

As illustrated in FIG. 1, an information processing system 1 according to the present example embodiment includes a remote examination terminal 10, an examination server 20, a mobile terminal 30 of a user U, a guiding apparatus 40, a signage terminal 50, and an automated gate apparatus 60.

The information processing system 1 according to the present example embodiment is a remote examination system that, for the user U who is scheduled to depart a first country from an airport DA in the first country by airplane and enter a second country that is different from the first country via an airport AA in the second country, performs an immigration examination as a remote examination when the user U enters the second country, for example. Note that the remote examination means performing an immigration examination on the user U who intends to enter the second country but has not yet arrived at an immigration examination site of the second country.

The information processing system 1 is operated by an institute of the second country, such as an administration office that controls entry to the second country or a subcontractor who has been charged with tasks from the institute, for example. In the second country, foreigners enter the second country from the first country, which is a foreign country, for various purposes such as sightseeing, business, or the like. Further, from the second country, persons of the second country or foreign residents depart for the first country for various purposes such as sightseeing, business, temporary return, or the like, and the persons of the second country or the foreign residents who departed for the first country return to and enter the second country. Note that a foreigner refers to a person who does not have a nationality of the second country. The information processing system 1 remotely performs an immigration examination on the user U who enters the second country in the same manner as on the above persons.

Specifically, the information processing system 1 is operated by an institute such as the Immigration Bureau of Japan, which is the second country, and remotely performs an immigration examination on the user U who enters Japan from the first country that is a foreign country such as the United States, for example. Note that the first country may be a particular country or may include a plurality of countries.

Note that the information processing system 1 may be a system that remotely performs an immigration examination not only on the user U who enters the country from an airport but also on the user U who enters the country from a seaport or the like.

The remote examination terminal 10 is installed in a restricted area DA14 in the airport DA in the first country from which the user U departs. The restricted area DA14 is an area that can be accessed by the user U who has completed a departure examination at a departure examination site DA12 in the airport DA when departing from the first country and has been checked for departure from the country. The user U boards an airplane bound for the second country via a boarding gate DA16 installed in the restricted area DA14. Note that, when the first country is a country requiring no departure examination, the term "departure examination site" can be replaced with "security examination site", and the term "departure examination" can be replaced with "security examination" in this specification.

For example, the remote examination terminal 10 is installed in a lounge, a boarding waiting room around the boarding gate DA16, a pathway, or the like in the restricted area DA14. The lounge in which the remote examination terminal 10 is installed is run by an airline company, a credit card company, an airport, or the like, for example. Note that the number of installed remote examination terminals 10 is not particularly limited and may be one or plural. Further, the installation place of the remote examination terminal 10 is also not particularly limited and may be various places in the restricted area DA14.

The examination server 20 is installed inside a facility of an institute such as an administration office that controls entry to the second country or the like, for example. The facility in which the examination server 20 is installed may be, for example, a domestic facility of the second country, a domestic facility of the first country, or even a domestic facility of another country that is neither the first country nor the second country. Note that the examination server 20 is not necessarily required to be a single server and may be configured as a server group including a plurality of servers. For example, one server responsible for a part of the function of the examination server 20 may be installed in the first country, and another server responsible for the remaining function of the examination server 20 may be installed in the second country.

The mobile terminal 30 is a terminal possessed or carried and used by the user U. The mobile terminal 30 is not particularly limited and is a portable information device such as a smartphone, a tablet terminal, a mobile phone, or the like, for example.

The guiding apparatus 40 is installed on a pathway AA14 that is a place through which the user U passes before reaching an immigration examination site AA16 in the airport AA of the second country that the user U enters. The pathway AA14 where the guiding apparatus 40 is installed is a pathway that connects a quarantine site AA12 to the immigration examination site AA16 in the airport AA, for example. In the quarantine site AA12, quarantine is provided to the user U scheduled to enter the country. In the immigration examination site AA16, an immigration examination is provided to the user U scheduled to enter the country. The guiding apparatus 40 is installed on a ceiling, a wall, or the like of the pathway AA14, for example, and projects a guidance notification on a floor F of the pathway AA14 as described later and guides the user U to a particular lane in the immigration examination site AA16. Note that the number of installed guiding apparatuses 40 is not particularly limited and may be one or plural. Further, the installation place of the guiding apparatus 40 is also not particularly limited and can be installed in various places from an arrival port for international flights to the immigration examination site AA16 in the airport AA of the second country.

The signage terminal 50 is installed in a place by which the user U passes before reaching the immigration examination site AA16 in the airport AA of the second country. The signage terminal 50 is installed in the pathway AA14, the entrance of the immigration examination site AA16, or the like, for example. The signage terminal 50 displays a guidance notification as described later and guides the user U to a particular lane in the immigration examination site AA16. Note that the number of installed signage terminals 50 is not particularly limited and may be one or plural. Further, the installation place of the signage terminal 50 is also not particularly limited and can be installed in various places from an arrival port for international flights to the immigration examination site AA16 in the airport AA of the second country.

The automated gate apparatus 60 is installed in the immigration examination site AA16. As illustrated in FIG. 2, the immigration examination site AA16 is provided with a remote examination dedicated lane L1 for the user U who has completed a remote examination and a normal lane L2 for the user U who has not yet completed a remote examination. The automated gate apparatus 60 is installed at the exit of the remote examination dedicated lane L1. On the other hand, an examination booth B in which a face-to-face immigration examination is provided by an examiner E is installed at the exit of the normal lane L2. Note that the number of installed automated gate apparatuses 60 is not particularly limited and may be one or plural. Further, the number of examination booths B is not particularly limited and may be one or plural.

As illustrated in FIG. 1, a plurality of monitoring cameras 70 are installed in various places in the airport DA of the first country. For example, in the restricted area DA14 of the airport DA of the first country, the monitoring cameras 70 that capture the remote examination terminal 10 and the periphery thereof are installed. Further, a plurality of monitoring cameras 80 are installed also in various places in the airport AA of the second country.

The remote examination terminal 10, the examination server 20, the guiding apparatus 40, the signage terminal 50, the automated gate apparatus 60, and the monitoring cameras 70 and 80 are connected to a network NW. The network NW is formed of a wide area network (WAN), a local area network (LAN), a mobile communication network, or the like. The LAN forming the network NW includes a private network of the airport DA of the first country, a private network of the airport AA of the second country, or the like. The mobile terminal 30 can wirelessly connect to the network NW, for example.

The remote examination terminal 10 and the examination server 20 can communicate with each other via the network NW. The examination server 20 and the mobile terminal 30 can communicate with each other via the network NW. The examination server 20 and the guiding apparatus 40 can communicate with each other via the network NW. The examination server 20 and the signage terminal 50 can communicate with each other via the network NW. The examination server 20 and the automated gate apparatus 60 can communicate with each other via the network NW.

Next, each component in the information processing system 1 according to the present example embodiment will be further described with reference to FIG. 3 to FIG. 8.

Figure 3:
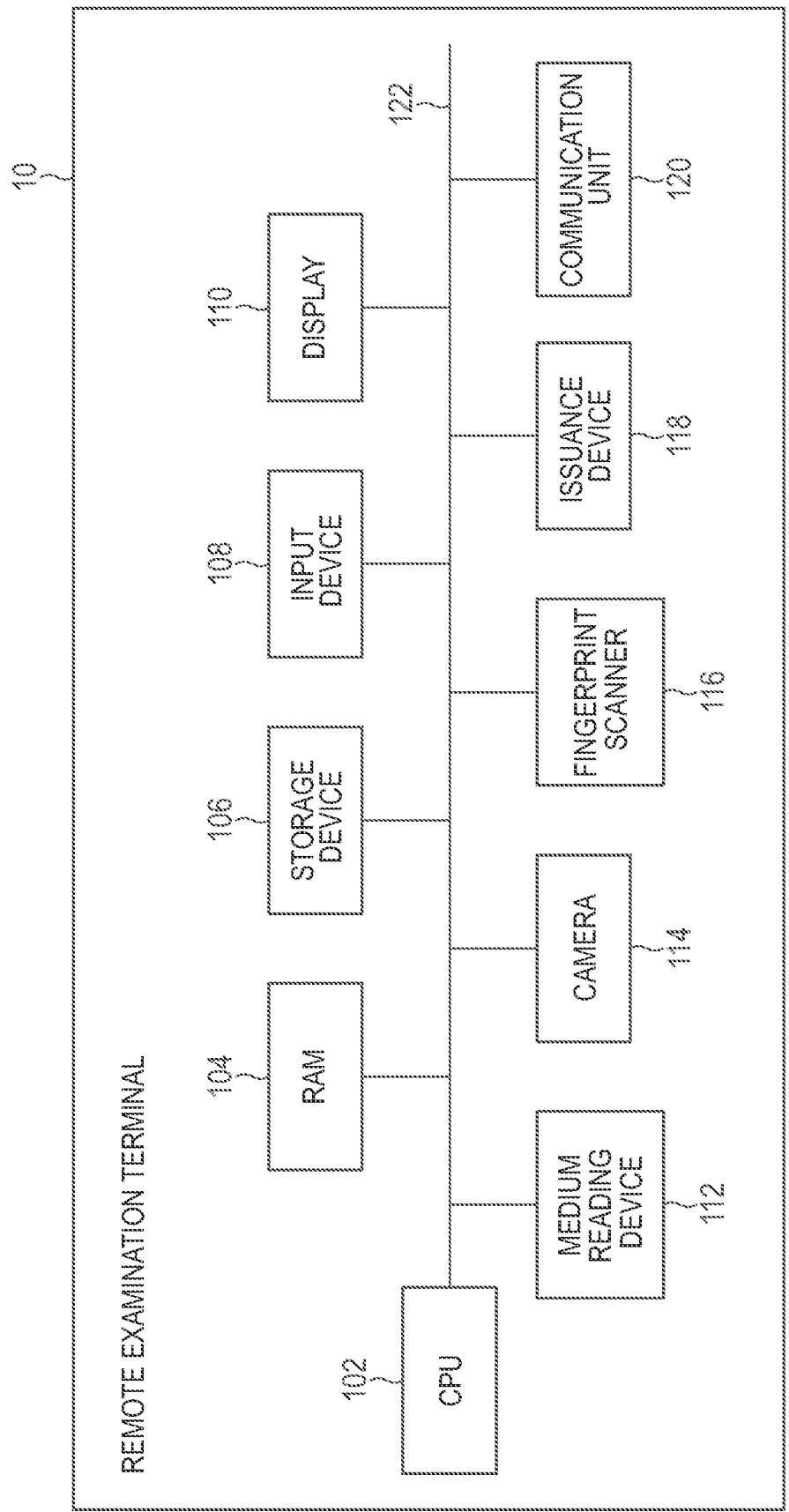
FIG. 3 is a block diagram illustrating an example of a hardware configuration of a remote examination terminal according to one example embodiment of the present invention.

First, the configuration of the remote examination terminal 10 will be described with reference to FIG. 3. FIG. 3 is a block diagram illustrating an example of a hardware configuration of the remote examination terminal 10.

The remote examination terminal 10 is an information processing apparatus that acquires, from the user U who has completed a departure examination and has been permitted to depart from the country in the airport DA of the first country, user information that is information required for an immigration examination in entry to the second country. That is, the remote examination terminal 10 is an information acquisition terminal that acquires user information related to the user U from the user U who has completed a departure examination of the first country but not started boarding for the second country. The remote examination terminal 10 is installed in a lounge, a boarding waiting room near the boarding gate DA16, or the like in the restricted area DA14, for example, in the airport DA in the first country. The remote examination terminal 10 is configured as a kiosk terminal operated by the user U by himself/herself, for example.

Note that the remote examination terminal 10 is not necessarily required to be installed in the restricted area DA14 of the airport DA of the first country. For example, the remote examination terminal 10 may be installed to a place that can connect to the network NW inside an airplane bound for the second country or may be provided in a movable manner. That is, the remote examination terminal 10 may be any terminal that acquires user information related to the user U from the user U who has completed a departure examination of the first country but not yet arrived at the second country.

As illustrated in FIG. 3, the remote examination terminal 10 has a central processing unit (CPU) 102, a random access memory (RAM) 104, a storage device 106, an input device 108, and a display 110. Furthermore, the remote examination terminal 10 has a medium reading device 112, a camera 114, a fingerprint scanner 116, an issuance device 118, and a communication unit 120. The CPU 102, the RAM 104, the storage device 106, the input device 108, the display 110, the medium reading device 112, the camera 114, the fingerprint scanner 116, the issuance device 118, and the communication unit 120 are connected to a bus line 122.

The CPU 102 operates by executing a program stored in the storage device 106 and functions as a control unit that controls the overall operation of the remote examination terminal 10. Further, the CPU 102 executes an application program stored in the storage device 106 to perform various processes as the remote examination terminal 10. The RAM 104 provides a memory area required for the operation of the CPU 102.

More specifically, the CPU 102 functions as an acquisition control unit that controls acquisition of various information related to the user U from the user U who uses the remote examination terminal 10. That is, the CPU 102 as the acquisition control unit controls acquisition of information from a user U's passport read by the medium reading device 112. Further, the CPU 102 controls acquisition of information from an airline ticket medium of the use U read by the medium reading device 112. Further, the CPU 102 controls acquisition of a face image that is biometric information on the user U captured by the camera 114. Further, the CPU 102 controls acquisition of a fingerprint image that is biometric information on the user U captured by the fingerprint scanner 116. The medium reading device 112, the camera 114, and the fingerprint scanner 116 function as an information acquisition unit that acquires various information included in the user information on the user U, respectively.

The CPU 102 can control the operation of the camera 114 and the fingerprint scanner 116 so that the face of the user U is captured by the camera 114 while the fingerprint of the user U is read by the fingerprint scanner 116. Accordingly, the CPU 102 can cause the camera 114 and the fingerprint scanner 116 to acquire a face image and a fingerprint image, which are multiple types of biometric information on the user U, in parallel. In such a way, by acquiring multiple types of biometric information from the user U in parallel, the remote examination terminal 10 can prevent impersonation of the user U attempted in a non-biometric manner as much as possible.

Further, the CPU 102 functions as an impersonation determination unit that, based on the status of acquisition of biometric information on the user U, determines whether or not the user U is impersonated. If both the face image of the user U captured by the camera 114 and the fingerprint image of the user U read by the fingerprint scanner 116 are acquired within a time limit, the CPU 102 as the impersonation determination unit determines that the user U is not impersonated. On the other hand, if either one of the face image and the fingerprint image of the user U is not acquired within the time limit, the CPU 102 determines that the user U is impersonated. The time limit is a time period from the time a passport or an airline ticket medium is read by the medium reading device 112, for example, and is set in advance taking into consideration of the time required for the user U operation or the like.

For example, when no fingerprint image is acquired by the fingerprint scanner 116 even when a face image is acquired by the camera 114, there is a likelihood of the user U being impersonated by a face photograph, a face image displayed on a tablet or the like, or the like. In such a case, the CPU 102 can determine that impersonation is taking place.

Further, the CPU 102 may analyze a video of the remote examination terminal 10 and the periphery thereof captured by the monitoring camera 70 and, based on the analysis result from the video, may determine whether or not the user U is impersonated. To perform impersonation determination, the CPU 102 can analyze the video of the remote examination terminal 10 and the periphery thereof captured by the monitoring camera 70 during capturing by the camera 114 and the reading by the fingerprint scanner 116 as the status of acquisition of biometric information on the user U. Based on the analysis result from the video, the CPU 102 can determine that the user U is impersonated when a plurality of persons are detected in front of the remote examination terminal 10, when unnatural behavior of the user U using the remote examination terminal 10 is detected, or the like, for example.

If the CPU 102 determines that impersonation is taking place, the CPU 102 may perform an alert process. As the alert process, the CPU 102 can cause an alert indicating the likelihood of impersonation being taking place to be displayed on the display 110 or output by voice from a speaker (not illustrated), for example. Further, as the alert process, the CPU 102 can transmit an alert indicating the likelihood of impersonation being taking place to an operation terminal that is an information terminal used by staff, an external server, or the like via the network NW, for example.

On the other hand, if the CPU 102 determines that no impersonation is taking place, the CPU 102 functions as an information providing unit that transmits and provides the user information, which is information related to the user U acquired from the user U who uses the remote examination terminal 10, to the examination server 20 via the network NW. The CPU 102 as the information providing unit provides the user information on the user U to the examination server 20 for an immigration examination of the second country for the user U. The user information on the user U transmitted to the examination server 20 by the CPU 102 includes identity information, face information, fingerprint information, and boarding information on the user U associated with each other. A part or whole of the user information on the user U provided to the examination server 20 is used for an immigration examination of the second country performed by the examination server 20 on the user U.

The identity information is information related individually to the user U, such as the name, the nationality, the sexuality, the birthday, or the like of the user U. Further, the identity information includes passport information such as a passport number, a passport issuance country, a passport issuance date, a passport expiration date, or the like of the user U's passport. The identity information is information acquired from the user U's passport by the medium reading device 112.

The face information is biometric information on the user U and includes a captured face image of the user U and a passport face image of the user U. The captured face image is a user U's face image captured by the camera 114. The passport face image is a user U's face image acquired from the user U's passport by the medium reading device 112. The face information is not necessarily required to be a face image itself but may be a face feature amount that is a feature amount extracted from a face image.

The CPU 102 can also function as a matching unit that matches a captured face image with a passport face image. In such a case, the CPU 102 can also include matching information indicating a result of matching between a captured face image and a passport face image in the user information instead of the face information or in addition to the face information. In matching between a captured face image and a passport face image, the CPU 102 functioning as a matching unit can match both face images by matching a face feature amount extracted from the captured face image with a face feature amount extracted from the passport face image.

The fingerprint information is biometric information on the user U and includes a read fingerprint image of the user U. The read fingerprint image is a fingerprint image read by the fingerprint scanner 116. Further, when the user U's passport is an integrated circuit (IC) passport and the fingerprint image of the user U is stored in the IC passport, the fingerprint information can include a passport fingerprint image that is a fingerprint image read from the IC passport by the medium reading device 112. Each of the read fingerprint image and the passport fingerprint image may be a fingerprint image of one finger or two or more fingers of one hand or may be a fingerprint image of two or more fingers of both hands. The fingerprint information is not necessarily required to be a fingerprint image itself but may be a fingerprint feature amount that is a feature amount extracted from a fingerprint image.

The CPU 102 can also function as a matching unit that matches a read fingerprint image with a passport fingerprint image. In such a case, the CPU 102 can also include matching information indicating a result of matching between a read fingerprint image and a passport fingerprint image in the user information instead of the fingerprint information or in addition to the fingerprint information. In matching between a read fingerprint image and a passport fingerprint image, the CPU 102 functioning as a matching unit can match both fingerprint images by matching a fingerprint feature amount extracted from the read fingerprint image with a fingerprint feature amount extracted from the passport fingerprint image.

Note that the CPU 102 may include both face information and fingerprint information in user information or may include either one of face information and fingerprint information in user information as biometric information used for identity verification of the user U. The examination server 20 can perform identity verification of the user U by using at least one of face information and fingerprint information included in user information, as described later.

Further, the CPU 102 may include biometric information on the user U other than face information and fingerprint information in user information as biometric information used for identity verification of the user U. In such a case, the remote examination terminal 10 has a biometric information acquisition device that acquires the biometric information other than face information and fingerprint information.

The boarding information is information related to a flight that the user U plans to use, such as an airline company, a flight number, a departure place, an arrival place, a departure date and time, an arrival data and time, a seat type, or the like of an airplane that the user U plans to board. The boarding information is information acquired from an airline ticket medium of the user U by the medium reading device 112.

Note that user information on the user U transmitted to the examination server 20 is registered in a user information database (DB) 206*c* in the examination server 20 when it is determined that the user U is a subject of a remote examination.

Further, the CPU 102 functions as a notification unit that performs a notification process on the user U who used the remote examination terminal 10, in accordance with examination information or a not-subject notification received from the examination server 20, as described later. The CPU 102 as the notification unit can cause the display 110 to display the notification content in accordance with the examination information or the not-subject notification to notify the user U. Further, the CPU 102 can also cause the notification content in accordance with the examination information or the not-subject notification to be output by voice from a speaker (not illustrated) to notify the user U.

When examination information is received, the CPU 102 can notify the user U that the remote examination is completed by causing such a notification to be displayed on the display 110 or output by voice. Furthermore, in such a case, in accordance with which of entry permission information, entry refusal information, or face-to-face examination-required information the received examination information is, the CPU 102 can also notify the user U of a specific result of the remote examination by causing the specific result to be displayed on the display 110 or output by voice.

Note that, when acceptance completion information is received from the examination server 20 instead of examination information, the CPU 102 can notify the user U that user information used for a remote examination has been accepted by causing such a notification to be displayed on the display 110 or output by voice.

On the other hand, when a not-subject notification is received, the CPU 102 can notify the user U that the user U is not a subject of the remote examination by causing such a notification to be displayed on the display 110 or output by voice.

Further, the CPU 102 functions as a display control unit that causes the display 110 to display guidance, a notification, or the like to the user U. For example, the CPU 102 as the display control unit causes the display 110 to display a guidance window for guidance about how to use the remote examination terminal 10. The user U is able to operate the remote examination terminal 10 by himself/herself according to the guidance window displayed on the display 110. Further, for example, the CPU 102 causes the display 110 to display various notifications to the user U.

Further, the CPU 102 functions as an issuance control unit that causes the issuance device 118 to issue a ticket such as a piece of paper on which an examination completion code is printed based on examination information received from the examination server 20. The examination completion code is a code including examination completion information that is information indicating that a remote examination as an immigration examination is completed for the user U, which is a two-dimensional code such as a QR code (registered trademark) or a one-dimensional code such as a barcode, for example. The examination completion code can include personal identification information on the user U. Note that the examination completion code can be any code symbol that may include information.

A ticket with a printed examination completion code is issued to the user U who used the remote examination terminal 10 and possessed by the user U until entering the second country. The user U uses the ticket with the printed examination completion code at the automated gate apparatus 60 when entering the second country, as described later.

The examination completion code of the ticket issued by the issuance device 118 may be a onetime code for which a term of validity is set and which is valid only once, for example. The term of validity of an examination completion code may be, for example, a date and time calculated by adding the time required for various procedures taken before immigration or the time considering an arrival delay or the like to an arrival date and time of the user U at the second country included in boarding information. With the examination completion code being a onetime code for which a term of validity is set, high security can be ensured. The examination completion code is not necessarily required to be a onetime code that is valid only once for which a term of validity is set and may be a code for which a term of validity is set or a onetime code which is valid only once.

Note that the mobile terminal 30 may be configured to display a similar examination completion code on a display 310 at the display 310 of the mobile terminal 30 of the user U, as described later, instead of issuing a ticket on which an examination completion code is printed by the issuance device 118.

The storage device 106 is formed of a storage medium such as a nonvolatile memory, a hard disk drive, or the like and functions as a storage unit. The storage device 106 stores a program executed by the CPU 102, data referenced by the CPU 102 in execution of the program, or the like.

The input device 108 is a touch panel embedded in the display 110, for example. The input device 108 functions as an input unit that accepts input of an instruction from the user U. The user U may input various information to the remote examination terminal 10 or instruct the remote examination terminal 10 to perform a process via the input device 108.

The display 110 functions as a display unit that displays various windows to the user U who uses the remote examination terminal 10. For example, the display 110 displays a guidance window that guides how to use the remote examination terminal 10, a notification window for the user U, or the like.

The medium reading device 112 functions as an information acquisition unit that reads a passport or an airline ticket medium of the user U and acquires information recorded in the passport or the airline ticket medium. The airline ticket medium is a paper airline ticket, the mobile terminal 30 displaying an e-ticket copy, or the like, for example. For example, the medium reading device 112 is formed of a code reader, an image scanner, a contactless integrated circuit (IC) reader, an optical character reader (OCR) device, or the like and acquires information from various media held over the reading unit thereof.

For example, the medium reading device 112 reads and acquires identity information including a user U's passport information displayed on a passport surface by using an OCR device. Further, the medium reading device 112 reads and acquires a user U's passport face image displayed on the passport surface by using an image scanner, for example. Further, in a case of an IC passport, the medium reading device 112 reads and acquires identity information including the user U's passport information stored in an IC chip of the IC passport, a passport face image, or the like by using a contactless IC reader. Note that the biometric information on the user U recorded and included in a passport is not limited to a face image but may be another biometric information such as a fingerprint image. The medium reading device 112 can acquire biometric information on the user U included in a passport.

Further, for example, the medium reading device 112 reads a barcode or a QR code (registered trademark) displayed on an airline ticket medium by using a code reader and acquires boarding information on the user U from the airline ticket medium.

Note that the remote examination terminal 10 can not only acquire boarding information from an airline ticket medium but also acquire boarding information by another method. For example, the CPU 102 may inquire of the airline company server for reservation purchase information on an airline ticket based on a user U's credit card number, a reservation number, a confirmation number, or the like input by the user U via the input device 108 and acquire boarding information on the user U from the airline company server.

The camera 114 functions as a biometric information acquisition unit that acquires a face image of the user U as biometric information on the user U who uses the remote examination terminal 10. The camera 114 is an image capturing device such as a digital camera that captures a face of the user U in front of the remote examination terminal 10 as a moving image or a static image, for example, and acquires a captured face image that is a face image of the user U from the captured moving image or static image. The camera 114 captures a face of the user U who is getting his/her fingerprint read by the fingerprint scanner 116 and acquires a captured face image under the control of the CPU 102. Accordingly, the camera 114 acquires a face image of the user U in parallel to acquisition of a fingerprint image of the user U performed by the fingerprint scanner 116.

The fingerprint scanner 116 functions as a biometric information acquisition unit that acquires a fingerprint image of the user U as biometric information on the user U who uses the remote examination terminal 10. For example, the fingerprint scanner 116 is formed of two fingerprint scanners and reads fingerprints of both two fingers such as both index fingers with the balls thereof placed on respective reading surfaces to acquire respective fingerprint images.

Note that the remote examination terminal 10 can have a biometric information acquisition device other than the camera 114 and the fingerprint scanner 116 in accordance with biometric information included in the user information.

The issuance device 118 prints, on a ticket such as a piece of paper, an examination completion code including examination completion information indicating that a remote examination as an immigration examination is completed for the user U and issues the ticket with the printed examination completion code under the control of the CPU 102.

The communication unit 120 is connected to the network NW and transmits and receives data via the network NW. The communication unit 120 communicates with the examination server 20 or the like under the control of the CPU 102.

In such a way, the remote examination terminal 10 is configured.

Figure 4:
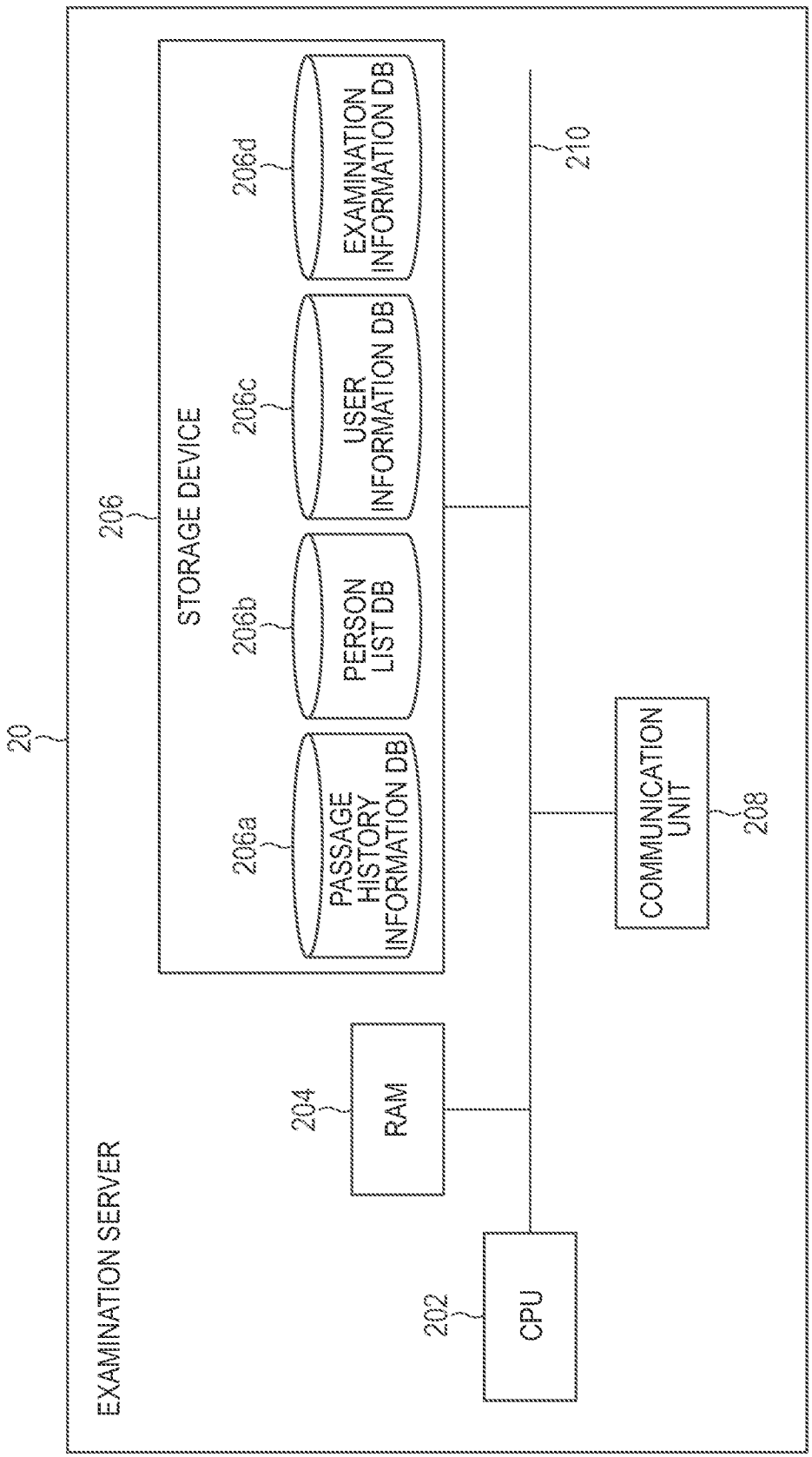
FIG. 4 is a block diagram illustrating an example of a hardware configuration of an examination server according to one example embodiment of the present invention.

Next, the configuration of the examination server 20 will be described with reference to FIG. 4. FIG. 4 is a block diagram illustrating an example of a hardware configuration of the examination server 20.

The examination server 20 is an information processing apparatus that performs an immigration examination of the second country on the user U when entering the second country as a remote examination for the user U based on user information on the user U received from the remote examination terminal 10. The examination server 20 can complete a remote examination before the user U arrives at the second country. Note that the function of the examination server 20 may be implemented by a single server or may be implemented by a plurality of servers.

As illustrated in FIG. 4, the examination server 20 has a CPU 202, a RAM 204, a storage device 206, and a communication unit 208. The CPU 202, the RAM 204, the storage device 206, and the communication unit 208 are connected to the bus line 210.

The CPU 202 operates by executing a program stored in the storage device 206 and functions as a control unit that controls the overall operation of the examination server 20. Further, the CPU 202 executes an application program stored in the storage device 206 to perform various processes as the examination server 20. The RAM 204 provides a memory area required for the operation of the CPU 202.

More specifically, the CPU 202 functions as an information management unit that stores passage history information that is information related to entry or departure of a passenger in the second country in the storage device 206 and manages the passage history information. The CPU 202 as the information management unit registers and manages passage history information in a passage history information DB 206a stored in the storage device 206. The CPU 202 can use passage history information for determination as to whether or not the user U is a subject of the remote examination. The passage history information on a passenger is transmitted to the examination server 20 from a management server that manages entry and departure of the passenger, for example. The CPU 202 registers the transmitted passage history information in the passage history information DB 206a and manages the passage history information.

Note that the passage history information DB 206a may be stored in a storage device of an external server such as a management server that manages entry and departure of passengers. In such a case, the CPU 202 of the examination server 20 can access the passage history information DB 206a of an external server via the network NW to acquire passage history information.

Further, the CPU 202 functions as a list management unit that stores a person list including a person whitelist (WL) and a list of persons under surveillance in the storage device 206 and manages the person list. The CPU 202 as the list management unit registers a person list in a person list DB 206b stored in the storage device 206 and manages the person list. The list of persons under surveillance is a list in which person information including biometric information on persons under surveillance who are to be refused for entry to the second country is registered. The person WL is a list in which person information including biometric information on persons who are to be permitted for entry to a site is registered. The CPU 202 uses a person list in a remote examination. Note that the person list is not necessarily required to include both the person WL and the list of persons under surveillance and may include either one of the person WL and the list of persons under surveillance. The CPU 202 may omit matching with a person WL or a list of persons under surveillance not included in the person list.

Further, the CPU 202 functions as a subject determination unit that determines whether or not the user U is a subject of the remote examination based on user information on the user U received from the remote examination terminal 10. The CPU 202 as the subject determination unit can determine whether or not the user U is a subject of the remote examination in accordance with various determination criteria based on user information on the user U. Specific examples of the determination criteria are as follows.

First, the CPU 202 can determine whether or not the user U is a subject of the remote examination based on passage history information that is information related to passage to the second country of the user U identified by the user information on the user U. For example, the CPU 202 can determine that the user U is a subject of the remote examination if the number of times of passage of the user U to the second country within a predetermined period immediately before a reference date such as a departure date, an arrival date, or the like of the user U is greater than or equal to a threshold and determine that the user U is not a subject of the remote examination if the number is less than the threshold. This determination criterion is to determine that the user U with the number of times of passage that is greater than or equal to the threshold is determined to be a subject of the remote examination as a reliable user. For this determination, the CPU 202 can acquire a departure date, an arrival date, or the like from boarding information included in the user information on the user U. Further, the CPU 202 can extract passage history information associated with personal identification information on the user U from the passage history information DB 206a stored in the storage device 206 and calculate the number of times of passage of the user U to the second country within a predetermined period.

Note that the CPU 202 can acquire and use a passport number from identity information included in user information on the user U, for example, as the personal identification information on the user U that is information uniquely identifying the user U. Further, the CPU 202 can acquire and use a combination of two or more of a name, a nationality, a birthday, and the like from identity information as the personal identification information on the user U. In addition, the CPU 202 can use information that can uniquely identify the user U included in user information as the personal identification information on the user U.

Further, when the user U's passport is an IC passport, the same passage history information as described above on the user U may be stored in the IC chip of the IC passport. In such a case, in addition to the user information on the user U, the CPU 102 of the remote examination terminal 10 can transmit passage history information read by the medium reading device 112 from the user's IC passport to the examination server 20 via the network NW. The CPU 202 of the examination server 20 can determine whether or not the user U is a subject of the remote examination in the same manner as described above based on the passage history information received from the remote examination terminal 10.

Further, the CPU 202 can determine whether or not the user U is a subject of the remote examination based on a time period to the boarding time identified from a boarding date and time in boarding information included in user information on the user U. For example, the CPU 202 can determine that the user U is a subject of the remote examination if the time period to the boarding time from the time the user information is acquired at the remote examination terminal 10 is shorter than or equal to a threshold on the longer time side and determine that the user U is not a subject if the time period is longer than a threshold on the longer time side. Further, for example, the CPU 202 can determine that the user U is a subject of the remote examination if the time period to the boarding time from the time the user information is acquired at the remote examination terminal 10 is longer than or equal to a threshold on the shorter time side and determine that the user U is not a subject if the time period is shorter than a threshold on the shorter time side. Note that the threshold on the longer time side is set to a longer period than the threshold on the shorter time side. These determination criteria are to determine that, when the time period from the time the user U uses the remote examination terminal 10 to the boarding time is excessively long or excessively short, such the user U is not a subject of the remote examination as a less reliable user with suspicious or unnatural behavior. In such a way, subjects of remote examination who do not need to have a face-to-face examination with the examiner E can be narrowed down to more reliable users U.

Further, the CPU 202 can determine whether or not the user U is a subject of the remote examination based on an airline company used by the user U acquired from boarding information included in user information on the user U. For example, the CPU 202 can determine that the user U is a subject of the remote examination when the airline company used by the user U is a Full Service Carrier (FSC) and determine that the user U is not a subject when the airline company is a Low Cost Carrier (LCC). Further, for example, the CPU 202 can determine that the user U is a subject of the remote examination if the airline company used by the user U is an airline company of the second country that operates the information processing system 1 and determine that the user U is not a subject when the airline company is an airline company of a country other than the second country. These determination criteria are to determine whether or not the user U is a subject of the remote examination in accordance with the attribute of an airline company used by the user U that may be a material to estimate the reliability of the user U. In such a way, subjects of remote examination who do not need to have a face-to-face examination with the examiner E can be narrowed down to more reliable users U.

Further, the CPU 202 can determine whether or not the user U is a subject of the remote examination based on the seat type in an airplane used by the user U acquired from boarding information included in user information on the user U. For example, the CPU 202 can determine that the user U is a subject of the remote examination if the seat type in an airplane used by the user U is the first class or the business class and can determine that the user U is not a subject of the remote examination if the seat type is the economy class. This criterion is to determine whether or not the user U is a subject of the remote examination in accordance with a seat type that may be a material to estimate the reliability of the user U. In such a way, subjects of remote examination who do not need to have a face-to-face examination with the examiner E can be narrowed down to more reliable users U.

Further, the CPU 202 can determine whether or not the user U is a subject of the remote examination based on a prescribed number of subjects of remote examination set in advance. For example, the prescribed number of subjects of remote examination can be set in advance on an airplane basis in accordance with an estimated flight time of an airplane, a flight distance, or the like and, specifically, the prescribed number can be set to be greater for a larger estimated flight time or a longer flight distance. By setting the prescribed number in such a way, it is possible to reliably complete a remote examination before the user U reaches the immigration examination site AA16 of the second country. The CPU 202 can determine that the user U is a subject of the remote examination if the number of users U acquired from boarding information included in user information on the user U does not reach the prescribed number set in advance for an airplane used by the user U and determine that the user U is not a subject if the number of users U reaches the prescribed number.

Further, the CPU 202 can determine whether or not the user U is a subject of the remote examination in accordance with whether or not the user U is a pre-registered user who has pre-registered to use the remote examination. That is, the CPU 202 can determine that the user U is a subject of the remote examination if the user U is a pre-registered user. In such a case, information related to a pre-registered user is registered in a pre-registration information DB, which is a DB accessible from the CPU 202, and managed. The CPU 202 can determine whether or not the user U is a pre-registered user by referencing the pre-registration information DB.

Further, the CPU 202 can determine whether or not the user U is a subject of the remote examination in accordance with behavior of the user U in the airport DA of the first country. The behavior of the user U in the airport DA of the first country is captured by the monitoring camera 70 and recorded in a monitoring server (not illustrated) as a video, for example. The CPU 202 can access the monitoring server and identify the behavior of the user U in a video recorded in the monitoring server by using biometric information such as face information on the user U included in user information. For example, if the CPU 202 determines that the identified behavior is unnatural or suspicious behavior such as staying in a particular place for long time, behaving suspiciously at a shop such as a duty-free shop, or the like, the CPU 202 can determine that the user U is not a subject of the remote examination.

In addition to the above, the CPU 202 may determine whether or not the user U is a subject of the remote examination based on identity information included in user information on the user U.

Note that the CPU 202 can determine whether or not the user U is a subject of the remote examination by using some or all of the plurality of determination criteria described above.

If the CPU 202 determines that the user U is not a subject of the remote examination, the CPU 202 generates a not-subject notification that is a notification indicating that the user U is not a subject of the remote examination. The CPU 202 transmits the generated not-subject notification to the remote examination terminal 10.

Further, the CPU 202 functions as an information management unit that stores user information on the user U determined as a subject of the remote examination in the storage device 206 and manages the user information. The CPU 202 as the information management unit registers user information on the user U that is received from the remote examination terminal 10, in which the user U is determined as a subject of the remote examination, in a user information DB 206*c* stored in the storage device 206 and manages the user information.

Further, the CPU 202 functions as an examination unit that performs, as a remote examination, an immigration examination at entry to the second country on the user U determined as a subject of the remote examination. The CPU 202 as the examination unit functions as a biometric matching unit that performs biometric matching for identity verification using biometric information on the user U included in user information on the user U and a list matching unit that matches the user U with a person list including the person WL and the list of persons under surveillance.

The CPU 202 as the biometric matching unit performs biometric matching using biometric information included in user information on the user U and performs identity verification of the user U. For example, the CPU 202 can perform identity verification of the user U by performing face matching to match a captured face image included in user information with a passport face image included in the same user information. In the matching between a captured face image and a passport face image, the CPU 202 can match both the face images by matching a face feature amount extracted from the captured face image with a face feature amount extracted from the passport face image. Further, the CPU 202 can perform identity verification of the user U by performing fingerprint matching to match a read fingerprint image included in user information with a passport fingerprint image included in the same user information, for example. In the matching between read fingerprint images, the CPU 202 can match both the fingerprint images by matching a fingerprint feature amount extracted from the read fingerprint image with a fingerprint feature amount extracted from the passport fingerprint image.

Note that the CPU 202 may perform both face matching and fingerprint matching or may perform either one of face matching and fingerprint matching for identity verification of the user U.

The CPU 202 determines that the identity verification of the user U is successful if there is a matching in the biometric matching and determines that the identity verification of the user U failed if there is no matching in the biometric matching. The case where there is a matching in biometric matching is a case where, when both face matching and fingerprint matching are performed, there are matchings in both the face matching and the fingerprint matching or a case where, when either one of face matching and fingerprint matching is performed, there is a matching in the performed matching. The case where there is a matching in face matching is a case where a matching score indicating a matching degree or a similarity degree between a captured face image and a passport face image exceeds a predetermined threshold and both the face images exhibit a high matching degree or a high similarity degree. The case where there is a matching in fingerprint matching is a case where a matching score indicating a matching degree or a similarity degree between a read fingerprint image and a passport fingerprint image exceeds a predetermined threshold and both the fingerprint images exhibit a high matching degree or a high similarity degree.

Further, biometric information such as a face image, a fingerprint image, or the like of the user U may be pre-registered in a DB accessible from the examination server 20 in association with personal identification information on the user U in accordance with an advance application or the like. In such a case, the CPU 202 can perform identity verification of the user U by matching biometric information included in user information on the user U with biometric information pre-registered in association with personal identification information on the user U.

The CPU 202 as a list matching unit matches, at 1:N, information that can identify the user U included in user information on the user U with the same type of multiple pieces of information on a plurality of persons included in the person WL or the list of persons under surveillance registered in the person list DB 206*b*. The information that can identify the user U included in user information is face information, fingerprint information, identity information, passport information, or the like, for example. Accordingly, the CPU 202 determines whether or not the user U corresponds to a person registered in the person WL or the list of persons under surveillance.

Further, the CPU 202 as the examination unit generates entry permission information, entry refusal information, or face-to-face examination-required information as follows as examination information that is information indicating a result of a remote examination in accordance with the result of biometric matching and matching with the person list.

If the identity verification of the user U with the biometric matching is successful and the user U corresponds to a person in the person WL, the CPU 202 generates the entry permission information that is information indicating that the user U is permitted to enter the second country as the examination information.

Further, if the identity verification of the user U with the biometric matching is successful and the user U who does not correspond to a person in the person WL does not correspond to a person in the list of persons under surveillance, the CPU 202 also generates the entry permission information as the examination information.

Further, if the identity verification of the user U with the biometric matching is successful but the user U corresponds to a person in the list of persons under surveillance, the CPU 202 generates the entry refusal information that is information indicating that the user U is refused to enter the second country. Note that, in such a case, the CPU 202 may generate the face-to-face examination-required information that is information indicating that the user U is required to have a face-to-face examination with the examiner E in the examination booth B as the examination information. This enables careful refusal of entry.

On the other hand, if the identity verification of the user U with the biometric matching fails, the CPU 202 generates the face-to-face examination-required information that is information indicating that the user U is required to have a face-to-face examination with the examiner E in the examination booth B as the examination information. Note that, if the identity verification of the user U with the biometric matching is successful but the user U corresponds to a person in the list of persons under surveillance, the CPU 202 may also generate the face-to-face examination-required information instead of the entry refusal information.

Note that the CPU 202 can complete a remote examination at latest before the user U reaches the immigration examination site AA16 in the airport AA of the second country. For example, the CPU 202 can complete a remote examination while the user U who used the remote examination terminal 10 stays in front of the remote examination terminal 10. Further, the CPU 202 can complete a remote examination before the arrival date and time when the user U arrives at the second country, for example. The CPU 202 can acquire the arrival date and time from boarding information included in user information on the user U.

Further, the CPU 202 functions as an information management unit that stores examination information generated as described above in the storage device 206 and manages the examination information. The CPU 202 as the information management unit registers examination information in an examination information DB 206*d* stored in the storage device 206 and manages the examination information. The CPU 202 registers examination information on the user U in the examination information DB 206*d* in association with information that may uniquely identify the user U included in user information, such as personal identification information, face information, or the like or the user information itself on the user U.

Further, the CPU 202 functions as an information transmission unit that transmits examination information generated for the user U to the remote examination terminal 10. Note that, if the user U does not complete a remote examination while staying in front of the remote examination terminal 10, the CPU 202 can transmit acceptance completion information that is information indicating that user information used for the remote examination has been accepted instead of the examination information to the remote examination terminal 10.

Further, when a guidance notification request that requests a guidance notification related to the remote examination is received from the mobile terminal 30, the guiding apparatus 40, or the signage terminal 50, the CPU 202 functions as notification generation unit that generates a guidance notification related to the remote examination in accordance with the presence or absence of the examination information on the user U. The CPU 202 as the notification generation unit generates, in accordance with the presence or absence of the examination information, a guidance notification for the user U who uses the mobile terminal 30 that has transmitted a guidance notification request or for the user U detected by the guiding apparatus 40 or the signage terminal 50 that has transmitted a guidance notification request.

Based on personal identification information on the user U received together with a guidance notification request from the mobile terminal 30, the CPU 202 can search the examination information DB 206d for examination information associated with the above personal identification information.

Further, based on face information on the user U received together with a guidance notification request from the guiding apparatus 40, the CPU 202 can search the examination information DB 206d for examination information associated with face information that matches the above face information. The face information transmitted from the guiding apparatus 40 is a face image of the user U detected and captured by a camera 408 of the guiding apparatus 40 or a face feature amount extracted from the face image, as described later. A matching between pieces of biometric information such as face information, fingerprint information, or the like means that a matching score indicating a matching degree or a similarity degree between one biometric information and another biometric information exceeds a predetermined threshold and both pieces of biometric information indicate a high matching degree or a high similarity degree.

Further, based on face information on the user U received together with a guidance notification request from signage terminal 50, the CPU 202 can search the examination information DB 206d for examination information associated with face information that matches the above face information. The face information transmitted from the signage terminal 50 is a face image of the user U detected and captured by a camera 510 of the signage terminal 50 or a face feature amount extracted from the face image, as described later.

If examination information on the user U is found in the examination information DB 206d as the result of the search, the CPU 202 generates, as a guidance notification, an already-examined-specific guidance notification indicating that the remote examination is completed. The CPU 202 can generate a guidance notification explicitly or directly indicating that the remote examination is completed or can generate a guidance notification implicitly or indirectly indicating that the remote examination is completed. For example, as a guidance notification implicitly or indirectly indicating that the remote examination is completed, the CPU 202 may generate a guidance notification that guides the user U to the remote examination dedicated lane L1 and then to the automated gate apparatus 60.

Furthermore, if examination information on the user U is found in the examination information DB 206d, in accordance with which of the entry permission information, the entry refusal information, or the face-to-face examination-required information the examination information is, the CPU 202 can generate an already-examined-specific guidance notification also including the content indicated by each of the above. That is, if the examination information is the entry permission information, the CPU 202 can generate a guidance notification also indicating that the user U is permitted to enter the country. Further, when the examination information is the entry refusal information, the CPU 202 can generate a guidance notification also indicating that the user U is refused to enter the country. Further, when the examination information is the face-to-face examination-required information, the CPU 202 can generate a guidance notification also indicating that the user U is required to have a face-to-face examination with the examiner E in the examination booth B.

Note that, if the examination information is the entry refusal information or the face-to-face examination-required information, unlike the above, the CPU 202 can also generate a guidance notification that guides the user U to the normal lane L2.

On the other hand, if no examination information on the user U is found in the examination information DB 206d as the result of the search, the CPU 202 generates, as a guidance notification, an unexamined-specific guidance notification indicating that the remote examination has not been provided. The CPU 202 can generate a guidance notification explicitly or directly indicating that the remote examination has not been provided or can generate a guidance notification implicitly or indirectly indicating that the remote examination has not been provided. For example, as the guidance notification implicitly or indirectly indicating that the remote examination has not been provided, the CPU 202 may generate a guidance notification that guides the user to the normal lane L2.

Note that, if no examination information on the user U is present in the examination information DB 206d, the user U is a person who has not used the remote examination terminal 10 or a person determined as not a subject of the remote examination even after using the remote examination terminal 10. Therefore, in such a case, since it is not necessarily required to explicitly or directly indicate that the remote examination has not been provided, the CPU 202 only needs to generate a guidance notification that guides the user U to the normal lane L2.

The CPU 202 functions as a transmission unit that transmits the already-examined-specific or unexamined-specific guidance notification generated as described above via the network NW to the mobile terminal 30, the guiding apparatus 40, or the signage terminal 50 that has transmitted the guidance notification request. In response to the guidance notification request transmitted from the mobile terminal 30, the guiding apparatus 40, or the signage terminal 50, the CPU 202 can transmit the already-examined-specific or unexamined-specific guidance notification to the mobile terminal 30, the guiding apparatus 40, or the signage terminal 50.

Further, if biometric information on the user U who intends to pass through the automated gate apparatus 60 is received from the automated gate apparatus 60, the CPU 202 functions as a biometric matching unit that performs biometric matching using the received biometric information to perform identity verification of the user U. The CPU 202 as the biometric matching unit matches, at 1:N, the biometric information received from the automated gate apparatus 60 with biometric information included in user information registered in the user information DB 206c. For example, the biometric information transmitted from the automated gate apparatus 60 is a face image of the user U detected and captured by a camera that is a biometric information acquisition device 614 of the automated gate apparatus 60 or a face feature amount extracted from the face image, as described later. Further, the biometric information may be a fingerprint image of the user U read and acquired by a fingerprint scanner that is the biometric information acquisition device 614 of the automated gate apparatus 60 or a fingerprint feature amount extracted from the fingerprint image.

If user information including biometric information that matches the biometric information received from the automated gate apparatus 60 is found in the user information DB 206c as the result of the biometric matching, the CPU 202 determines that identity verification of the user U is successful. Note that the CPU 202 may receive multiple types of biometric information from the automated gate apparatus 60. In such a case, the CPU 202 can determine that identity verification of the user U is successful if user information including corresponding multiple types of biometric information that match the received multiple types of biometric information, respectively, is found in the user information DB 206c.

On the other hand, if no user information including biometric information that matches the biometric information received from the automated gate apparatus 60 is found in the user information DB 206c as the result of the biometric matching, the CPU 202 determines that identity verification of the user U failed.

The CPU 202 transmits matching information, which indicates a result of the identity verification from the biometric matching of the user U who intends to pass through the automated gate apparatus 60, to the automated gate apparatus 60 via the network NW.

Further, when an examination information request that requests examination information on the user U who intends to pass through the automated gate apparatus 60 is received from the automated gate apparatus 60, the CPU 202 functions as an information extraction unit that extracts the examination information on the user U from the examination information DB 206d. The CPU 202 as the information extraction unit can extract examination information on the user U if the CPU 202 determines that the identity verification of the user U is successful. The CPU 202 can extract biometric information that matches biometric information on the user U received from the automated gate apparatus 60 or examination information that is associated with the user information including the biometric information, for example. Further, the CPU 202 can extract examination information associated with personal identification information on the user U who intends to pass through the automated gate apparatus 60 received from the automated gate apparatus 60 in addition to an examination information request, for example.

Further, the CPU 202 functions as an information transmission unit that transmits the examination information extracted from the examination information DB 206d via the network NW to the automated gate apparatus 60 that has transmitted the examination information request.

The storage device 206 is formed of a storage medium such as a nonvolatile memory, a hard disk drive, or the like and functions as a storage unit. The storage device 206 stores a program executed by the CPU 202, data referenced by the CPU 202 in execution of the program, or the like.

Further, the storage device 206 stores the passage history information DB 206a, the person list DB 206b, the user information DB 206c, and the examination information DB 206d.

In the passage history information DB 206a, passage history information is registered. The passage history information registered in the passage history information DB 206a is information related to a passenger having a passage history of entry to the second country. For example, the passage history information is registered when the passenger enters the second country or when the passenger exits the second country. The passage history information includes passport information, biometric information, history information, or the like on a passenger having a passage history to the second country, for example. The passport information includes a passport number, a passport issuance country, identity information, or the like of a passport issued to the passenger. The identity information includes a name, a nationality, a birthday, a sexuality, or the like of the passenger. The biometric information is a face image, a fingerprint image, or the like of the passenger or a feature amount extracted from such biometric information. The number of pieces of biometric information may be one or plural. Further, the biometric information may be information acquired from an integrated circuit (IC) passport in which the biometric information on a passenger is stored or may be information directly acquired from a passenger at an examination. The history information includes a place of entry, a date of entry, a place of departure, a date of departure, an airplane flight number, or the like for the passenger. The place of entry and the place of departure may mean an airport where the passenger enters the country and an airport where the passenger exits the country, respectively. The passage history information and the passport information, the biometric information, and the history information included in the passage history information are associated with each other.

In the person list DB 206b, a person list is registered. The person list registered in the person list DB 206b includes a list of persons under surveillance and a person WL. In the person WL, biometric information, text information, or the like is registered as person information on persons to be permitted to enter the second country. The biometric information included in each person information in the person WL and the list of persons under surveillance is a face image, a fingerprint image, or the like of the person of interest or a feature amount extracted from such biometric information, for example.

In the user information DB 206c, user information on the user U that is a subject of the remote examination received from the remote examination terminal 10 is registered. The user information includes identity information, face information, fingerprint information, and boarding information on the user U associated with each other, as described above.

In the examination information DB 206d, the entry permission information, the entry refusal information, or the face-to-face examination-required information generated as described above is registered as examination information. The examination information on the user U is registered in the examination information DB 206d in association with the personal identification information, information that can uniquely identify the user U included in the user information, such as face information, or the user information on the user U itself.

Note that some or all of the passage history information DB 206a, the person list DB 206b, the user information DB 206c, and the examination information DB 206d are not necessarily required to be stored in the storage device 206 of the examination server 20. Some or all of the passage history information DB 206a, the person list DB 206b, the user information DB 206c, and the examination information DB 206d may be stored in a storage device of an external server accessible from the examination server 20 via the network NW.

The communication unit 208 is connected to the network NW and transmits and receives data via the network NW. The communication unit 208 communicates with the remote examination terminal 10, the guiding apparatus 40, the signage terminal 50, the automated gate apparatus 60, or the like under the control of the CPU 202.

In such a way, the examination server 20 is configured.

Figure 5:
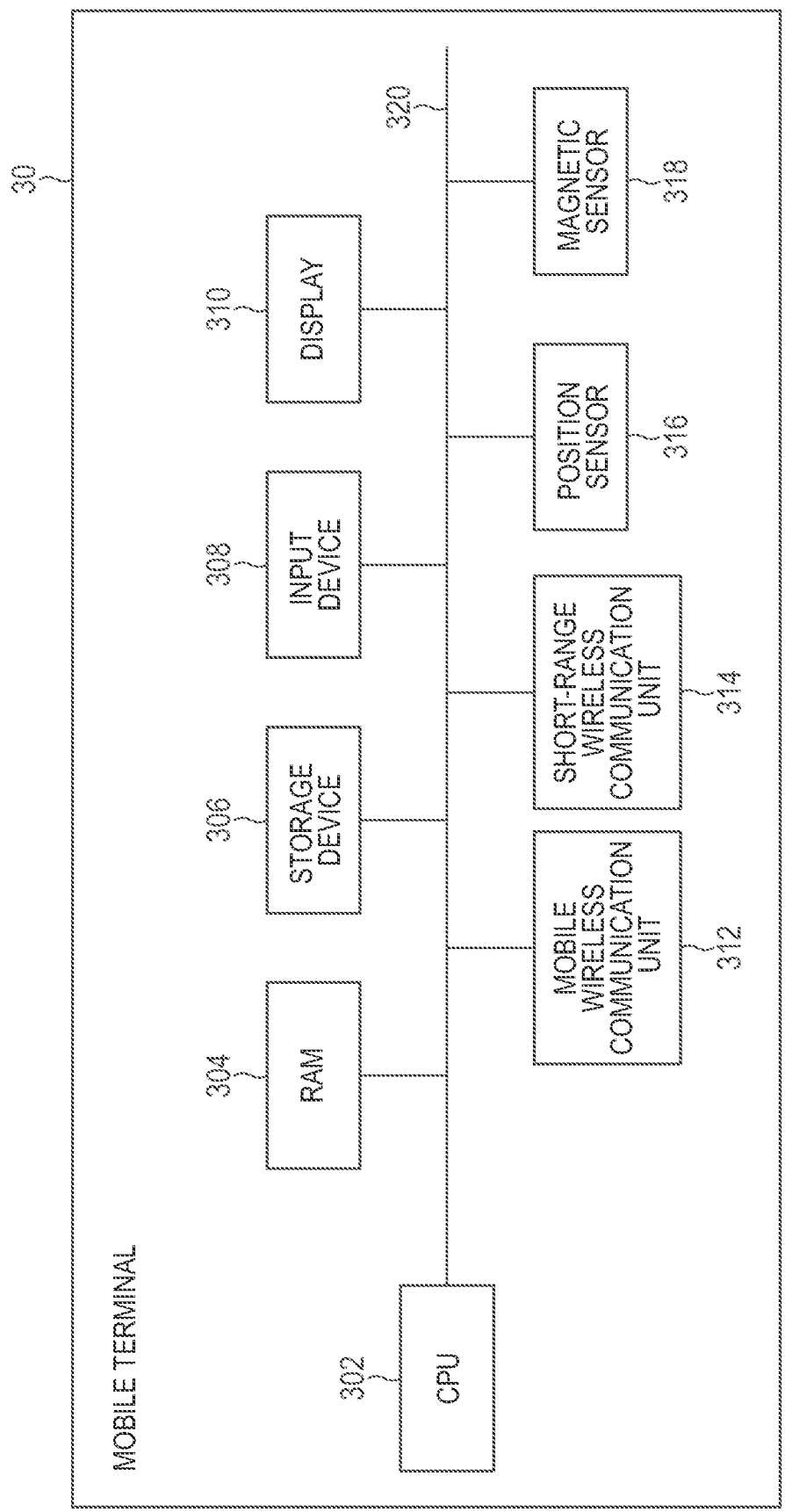
FIG. 5 is a block diagram illustrating an example of a hardware configuration of a mobile terminal according to one example embodiment of the present invention.

Next, the configuration of the mobile terminal 30 will be described with reference to FIG. 5. FIG. 5 is a block diagram illustrating an example of the hardware configuration of the mobile terminal 30.

The mobile terminal 30 is a terminal possessed or carried and used by the user U, which is a mobile information device such as a smartphone, a tablet terminal, a mobile phone, or the like, for example. The mobile terminal 30 is able to execute an immigration support application that is an application program used for supporting the user U to enter the second country.

As illustrated in FIG. 5, the mobile terminal 30 has a CPU 302, a RAM 304, a storage device 306, an input device 308, a display 310, a mobile wireless communication unit 312, a short-range wireless communication unit 314, a position sensor 316, and a magnetic sensor 318. The CPU 302, the RAM 304, the storage device 306, the input device 308, the display 310, the mobile wireless communication unit 312, the short-range wireless communication unit 314, the position sensor 316, and the magnetic sensor 318 are connected to a bus line 320.

The CPU 302 operates by executing a program stored in the storage device 306 and functions as a control unit that controls the overall operation of the mobile terminal 30. Further, the CPU 302 executes an application program stored in the storage device 306 to perform various processes as the mobile terminal 30. The RAM 304 provides a memory area required for the operation of the CPU 302.

For example, an immigration support application used for supporting the user U to enter the second country is installed in the storage device 306. The CPU 302 can perform various processes for supporting the user U to enter the country by executing the immigration support application.

More specifically, the CPU 302 functions as a determination unit that determines whether or not it is the timing that a guidance notification related to the remote examination from the examination server 20 should be received. In accordance with various determination criteria, the CPU 302 functioning as the determination unit can determine whether or not it is the timing that the guidance notification should be received. Specific examples of the determination criteria are as follows.

First, the CPU 302 can measure the position of the mobile terminal 30 based on position information acquired by the position sensor 316. Further, based on terrestrial magnetism information acquired by the magnetic sensor 318, the CPU 302 can measure the position of the mobile terminal 30, in particular, an indoor position of the mobile terminal 30 that a positioning satellite signal is difficult to reach. Based on information related to the position of the mobile terminal 30 acquired in such a way, the CPU 302 can determine whether or not it is the timing that the guidance notification should be received.

In more details, based on the position information acquired by the position sensor 316 or terrestrial magnetism information acquired by the magnetic sensor 318, the CPU 302 can detect that the user U possessing or carrying the mobile terminal 30 has entered or landed on the second country. The CPU 302 can determine that the timing that the entry or landing of the user U to the second country is detected in such a way is the timing that the guidance notification should be received.

Further, by using indoor positioning based on terrestrial magnetism information acquired by the magnetic sensor 318, the CPU 302 can detect that the user U possessing or carrying the mobile terminal 30 approaches the immigration examination site AA16 in the airport AA of the second country. Further, by the short-range wireless communication unit 314, the CPU 302 can detect that the user U carrying the mobile terminal 30 approaches the immigration examination site AA16 in the airport AA of the second country by using indoor positioning based on a beacon signal received. The beacon signal is a beacon signal using Bluetooth (registered trademark) Low Energy (BLE), for example. Further, beacon signals are transmitted from a plurality of beacon transmitters installed exhaustively in an airport. Note that the indoor positioning technology for detecting approach to the immigration examination site AA16 is not limited to the above, and various indoor positioning technologies using Wi-Fi (registered trademark) positioning or the like can be used.

The CPU 302 can determine that the timing that approach of the user U to the immigration examination site AA16 is detected as described above is the timing that the guidance notification should be received. Note that the degree that the user U approaches the immigration examination site AA16 is not particularly limited. For example, when the CPU 302 enters a location where the user U can view a guide display of the immigration examination site AA16 or the immigration examination site AA16 itself, the CPU 302 can determine that the user U approaches the immigration examination site AA16 and detect that the user U approaches the immigration examination site AA16.

Further, based on a date and time set in advance, the CPU 302 can determine whether or not it is the timing that the guidance notification should be received. For example, the CPU 302 can determine that the timing that an arrival date and time of an airplane bound for the second country or the timing that a date and time obtained by adding or subtracting a predetermined time period to or from the arrival date and time arrives is the timing that the guidance notification should be received. In such a case, the CPU 302 can acquire the arrival date and time from boarding information input by the user U via the immigration support application and stored in the storage device 306, an e-ticket copy stored in the storage device 306 as an airline ticket medium, or the like, for example.

Further, the CPU 302 can determine that the timing that the mobile terminal 30 is operated in association with entry to the second country is the timing that the guidance notification should be received. In the storage device 306 of the mobile terminal 30, a customs declaration application used for electrically applying customs declaration may be installed, for example, as an immigration-related application program in addition to the immigration support application. The CPU 302 can determine that the timing that such an immigration-related application program is executed or the timing that a particular operation is performed via the immigration-related application program is the timing that the guidance notification should be received.

Further, the CPU 302 can determine that the timing that an instruction to receive the guidance notification is input by the user U is the timing that the guidance notification should be received. The user U may input the instruction to receive the guidance notification via the immigration support application, for example. The user U may input, at any timing, the instruction to receive the guidance notification.

If the CPU 302 determines that it is the timing that the guidance notification should be received, the CPU 302 functions as a request unit that transmits, to the examination server 20, a guidance notification request that requests a guidance notification at that timing in addition to personal identification information on the user U who uses the mobile terminal 30. The CPU 302 can acquire and use the user U's passport number input via the immigration support application and stored in the storage device 306, for example, as the personal identification information on the user U. Further, the CPU 302 can also acquire and use a combination of two or more of a name, a nationality, a birthday, and the like included in identity information input via the immigration support application and stored in the storage device 306, for example, as the personal identification information on the user U. Further, the CPU 302 can also use biometric information on the user U such as a face image of the user U acquired by a camera (not illustrated) or the like of the mobile terminal 30 or a face feature amount extracted from the face image or the like as the personal identification information on the user U.

Further, the CPU 302 functions as a display control unit that causes the display 310 to display a guidance notification transmitted to the mobile terminal 30 from the examination server 20 in accordance with a guidance notification request. The CPU 302 as the display control unit causes the display 310 to display the content of an already-examined-specific or unexamined-specific guidance notification received from the examination server 20. The CPU 302 may cause a guidance notification to be displayed in a window of the immigration support application displayed on the display 310 or may cause a guidance notification to be displayed in a display format of a popup display, a banner display, or the like on the display 310, for example.

Note that the CPU 302 can also cause the content of a guidance notification to be output by voice from a speaker (not illustrated) or the like provided in the mobile terminal 30 in addition to or instead of the display of the guidance notification on the display 310.

Further, when an already-examined-specific guidance notification is received, the CPU 302 functions as a code generation unit that generates an examination completion code similar to the examination completion code printed on a ticket issued by the issuance device 118 of the remote examination terminal 10 described above. The CPU 302 can generate an examination completion code at any timing and cause the display 310 to display the examination completion code in accordance with an instruction input from the user U.

The storage device 306 is formed of a storage medium such as a nonvolatile memory, a hard disk drive, or the like and functions as a storage unit. The storage device 306 stores a program executed by the CPU 302, data referenced by the CPU 302 in execution of the program, or the like. The storage device 306 stores the immigration support application as an application program executed by the CPU 302.

The input device 308 is a touch panel embedded in the display 310, for example. The input device 308 functions as an input unit that accepts input of an instruction from the user U. The user U may input various information to the mobile terminal 30 or instruct the mobile terminal 30 to perform a process via the input device 308.

The display 310 functions as a display unit that displays various windows to the user U. For example, the display 310 displays a window that displays a guidance notification, a window that displays an examination completion code, or the like on the mobile terminal 30 executing the immigration support application.

The mobile wireless communication unit 312 connects to the network NW via a mobile communication network under the control of the CPU 302. The communication scheme of the mobile wireless communication unit 312 is not particularly limited and may be, for example, the third generation mobile communication scheme, the Long Term Evolution (LTE) scheme, the fourth generation mobile communication scheme, or the like.

The short-range wireless communication unit 314 wirelessly communicates with an access point, an external device, or the like under the control of the CPU 302 and connects to the network NW via an access point in the premise or the like of the airport AA, for example. The communication scheme of the short-range wireless communication unit 314 is not particularly limited and may be, for example, a wireless LAN scheme such as Wi-Fi (registered trademark) or the like, a Bluetooth (registered trademark) communication scheme, a Near Field Communication (NFC) scheme, an infrared communication scheme, or the like.

The position sensor 316 measures the position of the mobile terminal 30 by using Global Navigation Satellite System (GNSS). Thereby, the position sensor 316 acquires the position information indicating the position of the mobile terminal 30. The GNSS is not particularly limited and may be, for example, Global Positioning System (GPS), Global Navigation Satellite System (GLONASS), Galileo, Compass, or the like.

The magnetic sensor 318 detects a terrestrial magnetism at the position of the mobile terminal 30 and acquires terrestrial magnetism information. The magnetic sensor 318 is not particularly limited and detects a terrestrial magnetism by using a hole element, a magnetic resistor element, a magnetic impedance element, or the like, for example.

In such a way, the mobile terminal 30 is configured.

Figure 6:
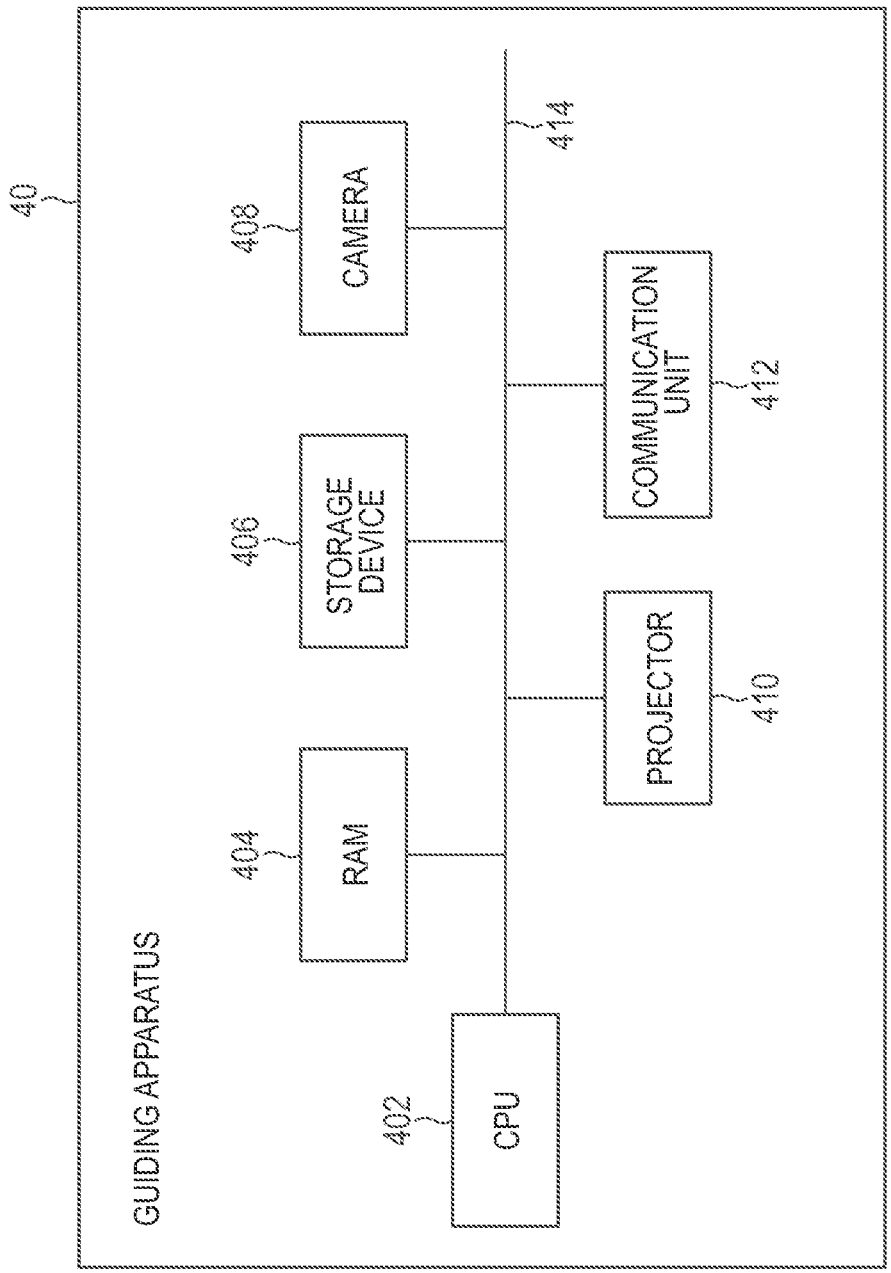
FIG. 6 is a block diagram illustrating an example of a hardware configuration of a guiding apparatus according to one example embodiment of the present invention.

Next, the configuration of the guiding apparatus 40 will be described with reference to FIG. 6. FIG. 6 is a block diagram illustrating an example of the hardware configuration of the guiding apparatus 40.

The guiding apparatus 40 is an apparatus that uses projection of a guidance notification on the floor F of the pathway AA14 connecting the quarantine site AA12 to the immigration examination site AA16 to provide guidance to the user U who arrives at the airport AA of the second country and moves to the immigration examination site AA16. The guiding apparatus 40 is a projection apparatus that can project the content of a guidance notification. The guiding apparatus 40 guides the user U to the remote examination dedicated lane L1 or the normal lane L2 in accordance with whether or not a remote examination has been provided to the user U.

As illustrated in FIG. 6, the guiding apparatus 40 has a CPU 402, a RAM 404, a storage device 406, a camera 408, a projector 410, and a communication unit 412. The CPU 402, the RAM 404, the storage device 406, the camera 408, the projector 410, and the communication unit 412 are connected to a bus line 414.

The CPU 402 operates by executing a program stored in the storage device 406 and functions as a control unit that controls the overall operation of the guiding apparatus 40. Further, the CPU 402 executes an application program stored in the storage device 406 to perform various processes as the guiding apparatus 40. The RAM 404 provides a memory area required for the operation of the CPU 402.

More specifically, when a face image of the user U passing through the pathway AA14 is acquired and the user U is detected by the camera 408, the CPU 402 functions as a request unit that transmits a guidance notification request, which requests a guidance notification, to the examination server 20 in addition to face information. The face information transmitted together with the guidance notification request is biometric information used for identify the user U, which is a face image acquired by the camera 408 or a face feature amount extracted from the face image.

Further, the CPU 402 functions as a projection control unit that causes the projector 410 to project a guidance notification transmitted to the guiding apparatus 40 from the examination server 20 in response to a guidance notification request on the floor F of the pathway AA14. The CPU 402 as the projection control unit causes the projector 410 to project the content of an already-examined-specific or unexamined-specific guidance notification received from the examination server 20.

Note that the CPU 402 may cause the content of a guidance notification to be output by voice from a speaker (not illustrated) or the like provided to the guiding apparatus 40 in addition to or instead of the projection of the guidance notification from the projector 410.

The storage device 406 is formed of a storage medium such as a nonvolatile memory, a hard disk drive, or the like and functions as a storage unit. The storage device 406 stores a program executed by the CPU 402, data referenced by the CPU 402 in execution of the program, or the like.

The camera 408 functions as a biometric information acquisition unit that acquires a face image of the user U as biometric information on the user U passing through the pathway AA14. For example, the camera 408 is a digital camera that captures the pathway AA14 as a moving image or continuous static images and, in response to detecting a face of the user U in the captured moving image or continuous static images, captures the face of the user U and acquires the face image.

Note that the guiding apparatus 40 can have a biometric information acquisition device that acquires biometric information that can be used for identifying the user U passing through the pathway AA14 in addition to the camera 408.

The projector 410 functions as a projection unit that projects the content of an already-examined-specific or unexamined-specific guidance notification received from the examination server 20 on the floor F of the pathway AA14. The projector 410 as a projection unit projects the content of a guidance notification at a position on the floor F that is visible for the user U in front of the user U moving on the pathway AA14. Further, the projector 410 can change the position where to project the content of a guidance notification on the floor F in accordance with the position of the moving user U by changing a projection direction by a pan-tilt mechanism or the like following the motion of the user U moving on the pathway AA14, for example.

The communication unit 412 is connected to the network NW and transmits and receives data via the network NW. The communication unit 412 communicates with the examination server 20 or the like under the control of the CPU 402.

In such a way, the guiding apparatus 40 is configured.

Figure 7:
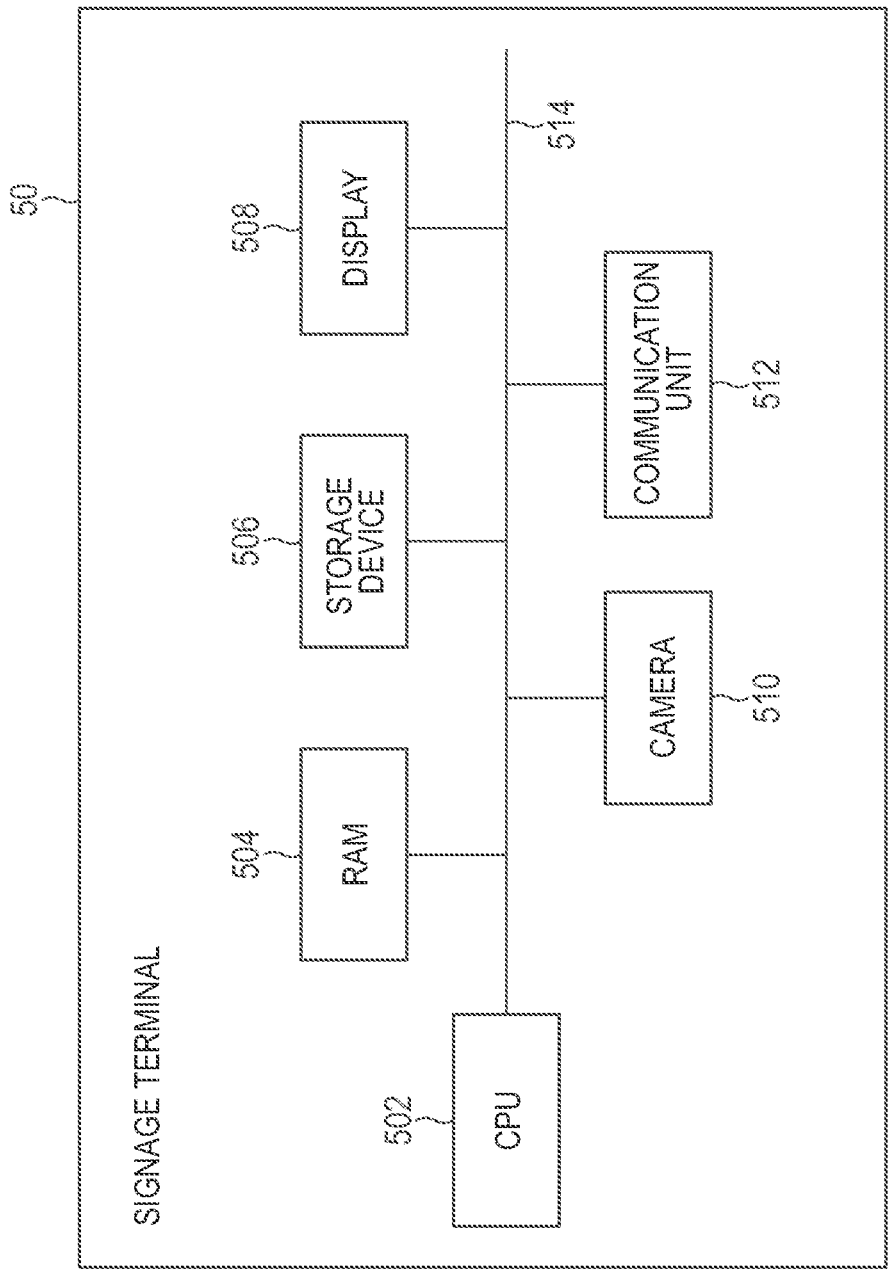
FIG. 7 is a block diagram illustrating an example of a hardware configuration of a signage terminal according to one example embodiment of the present invention.

Next, the configuration of the signage terminal 50 will be described with reference to FIG. 7. FIG. 7 is a block diagram illustrating an example of the hardware configuration of the signage terminal 50.

The signage terminal 50 is an apparatus that uses display of a guidance notification on the pathway AA14, at the entrance of the immigration examination site AA16, or the like, for example, to provide guidance to the user U who arrives at the airport AA of the second country and moves to the immigration examination site AA16. The signage terminal 50 is a display terminal that can display the content of a guidance notification.

As illustrated in FIG. 7, the signage terminal 50 has a CPU 502, a RAM 504, a storage device 506, a display 508, a camera 510, and a communication unit 512. The CPU 502, the RAM 504, the storage device 506, the display 508, the camera 510, and the communication unit 512 are connected to a bus line 514.

The CPU 502 operates by executing a program stored in the storage device 506 and functions as a control unit that controls the overall operation of the signage terminal 50. Further, the CPU 502 executes an application program stored in the storage device 506 to perform various processes as the signage terminal 50. The RAM 504 provides a memory area required for the operation of the CPU 502.

More specifically, when a face image of the user U in front of the signage terminal 50 is acquired and the user U is detected by the camera 510, the CPU 502 functions as a request unit that transmits a guidance notification request, which requests a guidance notification, to the examination server 20 in addition to face information. The face information transmitted together with the guidance notification request is biometric information used for identifying the user U, which is a face image acquired by the camera 510 or a face feature amount extracted from the face image.

Further, the CPU 502 functions as a display control unit that causes the display 508 to display a guidance notification transmitted to the signage terminal 50 from the examination server 20 in response to a guidance notification request. The CPU 502 as the display control unit causes the display 508 to display the content of an already-examined-specific or unexamined-specific guidance notification received from the examination server 20.

Note that the CPU 502 may cause the content of a guidance notification to be output by voice from a speaker (not illustrated) or the like provided to the signage terminal 50 in addition to or instead of the display of the guidance notification on the display 508.

Further, the CPU 502 can cause the display 508 to display a guidance notification that is display for a particular user U together with and at the same time as general display such as an advertisement, route guidance, or the like. Further, the CPU 502 can also cause the display 508 to display a guidance notification that is display for a particular user U and general display such as an advertisement, route guidance, or the like while switching the display at a predetermined time interval.

The storage device 506 is formed of a storage medium such as a nonvolatile memory, a hard disk drive, or the like and functions as a storage unit. The storage device 506 stores a program executed by the CPU 502, data referenced by the CPU 502 in execution of the program, or the like.

The display 508 functions as a display unit that displays a window displaying a guidance notification, a window displaying an advertisement, route guidance, or the like, or the like to the user U in front of the signage terminal 50.

The camera 510 functions as a biometric information acquisition unit that acquires a face image of the user U as biometric information on the user U in front of the signage terminal 50. For example, the camera 510 is a digital camera that captures an area in front of the signage terminal 50 as a moving image or continuous static images and, in response to detecting a face of the user U in the captured moving image or continuous static images, captures the face of the user U and acquires the face image.

Note that the signage terminal 50 can have a biometric information acquisition device that acquires biometric information that can be used for identifying the user U in front of the signage terminal 50 in addition to the camera 510.

The communication unit 512 is connected to the network NW and transmits and receives data via the network NW.

The communication unit 512 communicates with the examination server 20 or the like under the control of the CPU 502.

In such a way, the signage terminal 50 is configured.

Figure 8:
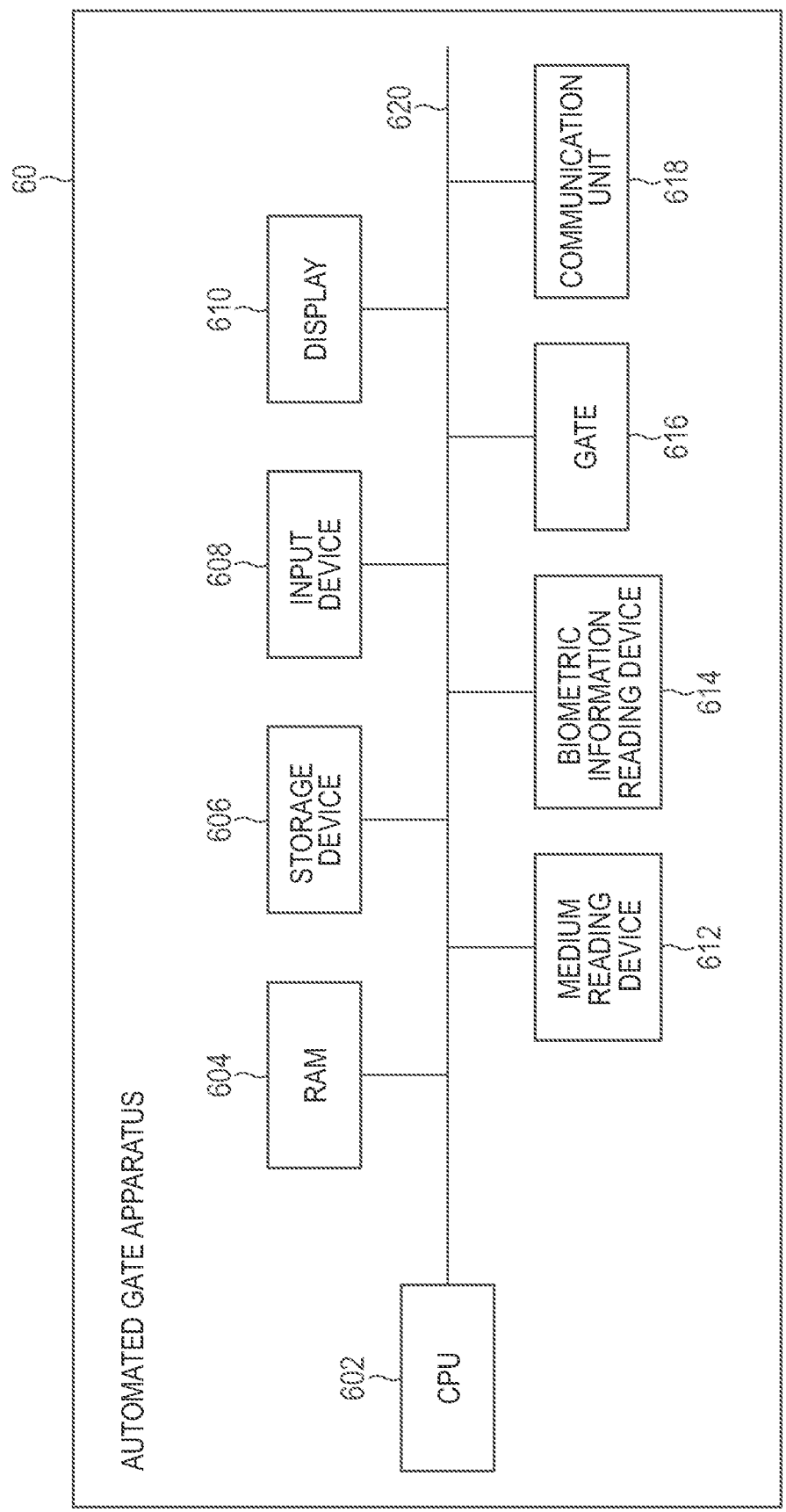
FIG. 8 is a block diagram illustrating an example of a hardware configuration of an automated gate apparatus according to one example embodiment of the present invention.

Next, the configuration of the automated gate apparatus 60 will be described with reference to FIG. 8. FIG. 8 is a block diagram illustrating an example of the hardware configuration of the automated gate apparatus 60.

The automated gate apparatus 60 is a gate apparatus that is installed at the exit of the remote examination dedicated lane L1 in the immigration examination site AA16 and controls passage of the user U in accordance with a result of a remote examination of the user U who completed the remote examination. The user U who is permitted to pass through the automated gate apparatus 60 can pass through the automated gate apparatus 60 to exit the immigration examination site AA16. The user U exiting the immigration examination site AA16 picks up his/her deposited baggage at a baggage claim counter if necessary, then goes through a customs examination, and completes procedures related to entry to the second country in the airport AA of the second country, for example.

As illustrated in FIG. 8, the automated gate apparatus 60 has a CPU 602, a RAM 604, a storage device 606, an input device 608, a display 610, a medium reading device 612, a biometric information acquisition device 614, a gate 616, and a communication unit 618. The CPU 602, the RAM 604, the storage device 606, the input device 608, the display 610, the medium reading device 612, the biometric information acquisition device 614, the gate 616, and the communication unit 618 are connected to a bus line 620.

The CPU 602 operates by executing a program stored in the storage device 606 and functions as a control unit that controls the overall operation of the automated gate apparatus 60. Further, the CPU 602 executes an application program stored in the storage device 606 to perform various processes as the automated gate apparatus 60. The RAM 604 provides a memory area required for the operation of the CPU 602.

More specifically, the CPU 602 functions as a determination unit that determines whether or not an examination completion code read by the medium reading device 612 is valid. The examination completion code is a code printed on a ticket issued to the user U by the remote examination terminal 10, a code displayed on the display 310 of the mobile terminal 30 of the user U, or the like, for example. The CPU 602 as the determination unit determines that the examination completion code is valid when the examination completion code includes examination completion information indicating that the remote examination is completed. Even in such a case, however, the CPU 602 determines that the examination completion code is invalid when the term of validity of the examination completion code has passed or when there is a history that a onetime valid examination completion code has been read by the medium reading device 612. Further, the CPU 602 determines that the examination completion code is invalid when the examination completion code does not include examination completion information indicating that the remote examination is completed.

If the CPU 602 determines that the examination completion code is invalid, the CPU 602 can perform an alert process. The CPU 602 can cause an alert indicating that the examination completion code is invalid to be displayed on the display 610 or output by voice from a speaker (not illustrated), for example, as the alert process. Further, the CPU 602 can transmit an alert indicting that the examination completion code is invalid to an operation terminal that is an information terminal used by staff, an external server, or the like via the network NW, for example, as the alert process.

Note that the CPU 602 is not necessarily required to be configured to function as the determination unit that determines whether or not the examination completion code is valid. In such a case, the medium reading device 612 that reads an examination completion code is unnecessary, and the user U is not required to use an examination completion code when passing through the automated gate apparatus 60.

Further, the CPU 602 functions as an acquisition control unit that controls acquisition of biometric information such as a face image of the user U by the biometric information acquisition device 614. If the CPU 602 determines that the examination completion code is valid, the CPU 602 as the acquisition control unit causes the biometric information acquisition device 614 to acquire biometric information on the user U. Note that, when not determining the validity of the examination completion code, the CPU 602 causes the biometric information acquisition device 614 to always acquire biometric information on the user U in front of the automated gate apparatus 60.

Further, if the CPU 602 acquires biometric information from the user U, the CPU 602 functions as a request unit that transmits, to the examination server 20, an examination information request, which requests examination information, in addition to the acquired biometric information. The CPU 602 can transmit face information that is a face image of the user U acquired by the biometric information acquisition device 614 or a face feature amount extracted from the face image, for example, as the biometric information. Further, the CPU 602 can transmit fingerprint information that is a fingerprint image of the user U acquired by the biometric information acquisition device 614, a fingerprint feature amount extracted from the fingerprint image, or the like, for example, as the biometric information. Note that the CPU 602 can transmit one type or multiple types of biometric information.

Note that the CPU 602 can transmit personal identification information on the user U read from an examination completion code by the medium reading device 612 to the examination server 20 in addition to an examination information request.

Further, the CPU 602 functions as a determination unit that determines passage permission as to whether or not to permit the user U to pass through the automated gate apparatus 60. The CPU 602 as the determination unit determines whether or not to permit passage of the user U based on matching information indicating a result of identity verification from biometric matching of the user U received from the examination server 20 and examination information on the user U received from the examination server 20.

If the matching information received from the examination server 20 indicates successful identity verification of the user U and the examination information received from the examination server 20 is the entry permission information, the CPU 602 determines to permit the user U to pass through the automated gate apparatus 60.

On the other than, if the matching information received from the examination server 20 indicates that identity verification of the user U failed, the CPU 602 determines not to permit the user U to pass through the automated gate apparatus 60. Further, if the matching information received from the examination server 20 indicates successful identity verification of the user U but the examination information received from the examination server 20 is the entry refusal information, the CPU 602 determines not to permit the user U to pass through the automated gate apparatus 60. Further, if the matching information received from the examination server 20 indicates successful identity verification of the user U but the examination information received from the examination server 20 is the face-to-face examination-required information, the CPU 602 determines not to permit the user U to pass through the automated gate apparatus 60.

If the CPU 602 determines to permit passage of the user U, the CPU 602 controls the gate 616 to open the gate 616 from a closed state to an opened state. Accordingly, the CPU 602 permits the user U to pass through the gate 616.

On the other hand, if the CPU 602 determines not to permit passage of the user U, the CPU 602 can perform an alert process. The CPU 602 can cause an alert indicating that passage through the automated gate apparatus 60 is not permitted to be displayed on the display 610 or output by voice from a speaker (not illustrated), for example, as the alert process. Further, the CPU 602 can transmit an alert indicating that passage through the automated gate apparatus 60 is not permitted to an operation terminal that is an information terminal used by staff, an external server, or the like via the network NW, for example, as the alert process.

Note that, if the CPU 602 determines not to permit passage of the user U, the CPU 602 maintains the closed state of the gate 616.

Further, the CPU 602 functions as a display control unit that causes the display 610 to display a window of guidance, a notification, or the like to the user U. For example, the CPU 602 as the display control unit causes the display 610 to display a guidance window that guides the user U about how to use the automated gate apparatus 60. Further, the CPU 602 causes the display 610 to display a notification window notifying that a valid or invalid examination completion code has been read, that passage of the automated gate apparatus 60 is permitted or not permitted, or the like, for example.

The storage device 606 is formed of a storage medium such as a nonvolatile memory, a hard disk drive, or the like and functions as a storage unit. The storage device 606 stores a program executed by the CPU 602, data referenced by the CPU 602 in execution of the program, or the like.

The input device 608 is a touch panel embedded in the display 610, for example. The input device 608 functions as an input unit that accepts input of an instruction from the user U. The user U may input various information or instruction for performing a process to the automated gate apparatus 60 via the input device 608.

The display 610 functions as a display unit that displays various windows to the user U who intends to pass through the automated gate apparatus 60. For example, the display 610 displays a guidance window guiding the user U about how to use the automated gate apparatus 60, a notification window to the user U, or the like.

The medium reading device 612 functions as an information acquisition unit that reads and acquires information included in an examination completion code from an examination completion code printed on a ticket possessed by the user U or an examination completion code displayed on the display 310 of the mobile terminal 30. The medium reading device 612 can read and acquire information such as examination completion information, personal identification information on the user U, or the like included in an examination completion code. The medium reading device 612 is formed of a code reader that can read a two-dimensional code such as a QR code or a one-dimensional code such as a barcode, for example. The medium reading device 612 reads and acquires information from an examination completion code held over the reading unit thereof.

Note that the medium reading device 612 can also be configured to read and acquire passport information from the user U's passport. The passport information read by the medium reading device 612 can be used for identity verification of the user U in addition to or instead of biometric information acquired by the biometric information acquisition device 614. In such a case, the CPU 602 can transmit passport information to the examination server 20 in addition to an examination information request. The CPU 202 of the examination server 20 can search the user information DB 206c including passport information that matches passport information received from the automated gate apparatus 60 to perform identity verification of the user U.

The biometric information acquisition device 614 functions as a biometric information acquisition unit that acquires biometric information on the user U in front of the automated gate apparatus 60 who intends to pass through the automated gate apparatus 60. The biometric information acquisition device 614 is a digital camera that captures a face of the user U in front of the automated gate apparatus 60 and acquires a face image of the user U, for example. Further, the biometric information acquisition device 614 may be a fingerprint scanner that acquires a fingerprint image from the user U in front of the automated gate apparatus 60, for example. A fingerprint scanner having the same configuration as the fingerprint scanner 116 of the remote examination terminal 10 can be used, for example. Note that the biometric information acquisition device 614 may be a device that acquires one type of biometric information on the user U or a device that acquires multiple types of biometric information.

Note that the automated gate apparatus 60 can have a biometric information acquisition device other than a digital camera, a fingerprint scanner, or the like that acquires biometric information used for identity verification of the user U.

The gate 616 is opened from a closed state, which has been applied during standby to block passage of the user U, to an opened state to permit passage of the user U under the control of the CPU 602 when the user U is permitted to pass through the automated gate apparatus 60. The scheme of the gate 616 is not particularly limited and may be, for example, a flapper gate in which flappers provided on one side or both sides of a pathway are opened and closed, a turn style gate in which three bars are rotated, or the like.

The communication unit 618 is connected to the network NW and transmits and receives data via the network NW. The communication unit 618 communicates with the examination server 20 or the like under the control of the CPU 602.

In such a way, the automated gate apparatus 60 is configured.

In the information processing system 1 according to the present example embodiment, the remote examination terminal 10 acquires user information including identity information, biometric information, and boarding information related to the user U used for a remote examination from the user U who has completed a departure examination of the first country but not started boarding for the second country. According to the remote examination terminal 10 of the present example embodiment, since user information on the user U used for an immigration examination of the second country is acquired using waiting time of the user U who has completed a departure examination of the first country and is waiting for boarding an airplane bound for the second country, it is possible to efficiently make use of the user U's time. Moreover, since user information is acquired from the user U who has completed a departure examination of the first country, a certain level of reliability can be ensured for the user information.

Further, in the information processing system 1 according to the present example embodiment, the examination server 20 performs an immigration examination of the second country as a remote examination based on user information related to the user U acquired by the remote examination terminal 10 from the user U who has completed a departure examination of the first country but not started boarding for the second country. According to the examination server 20 of the present example embodiment, since a remote examination is performed based on user information acquired from the user U who has not started boarding for the second country, the remote examination can be completed before the user U reaches the immigration examination site AA16 after arriving at the second country. It is not necessary to acquire user information used for an immigration examination in the immigration examination site AA16 for the user U who has completed the remote examination. In such a way, according to the present example embodiment, it is possible to reduce the processes or procedures to be performed in the immigration examination site AA16. Accordingly, it is possible to prevent a line of persons waiting for exiting the immigration examination site AA16 from occurring as much as possible.

Furthermore, in the information processing system 1 according to the present example embodiment, the user U can receive a guidance notification related to remote examination from the mobile terminal 30, the guiding apparatus 40, or the signage terminal 50. Therefore, according to the present example embodiment, smooth behavior of the user U in accordance with the guidance notification can be expected in entry to the second country.

As described above, according to the present example embodiment, since user information related to the user U is acquired from the user U who has completed a departure examination of the first country but not started boarding for the second country and an immigration examination of the second country is performed as a remote examination based on such user information, the immigration examination of the second country can be efficiently performed.

The operation of each component in the information processing system 1 according to the present example embodiment will be further described below with reference to FIG. 9 to FIG. 17.

Figure 9:
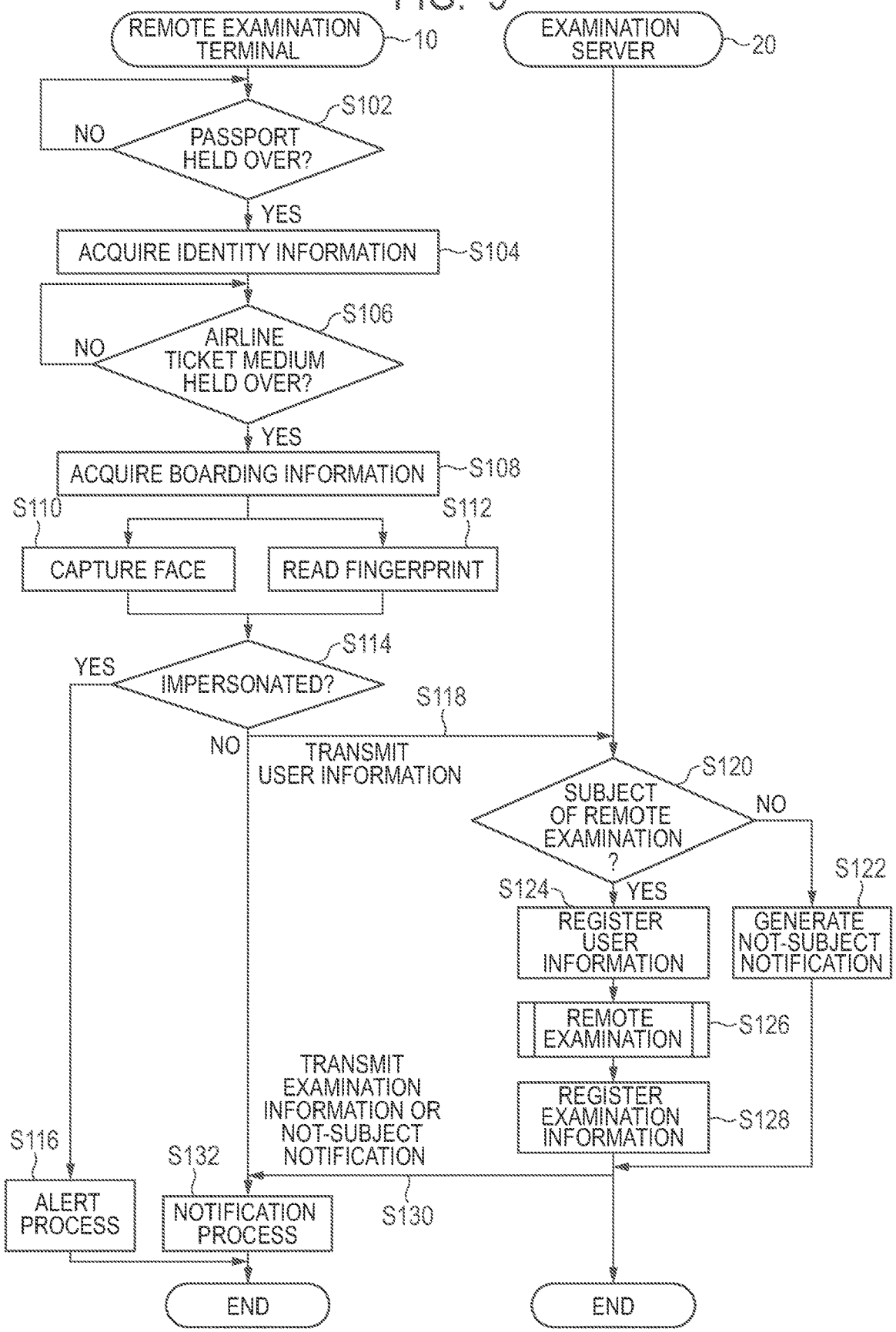
FIG. 9 is a sequence diagram illustrating the operation of the remote examination terminal and the examination server in the information processing system according to one example embodiment of the present invention.
Figure 10:
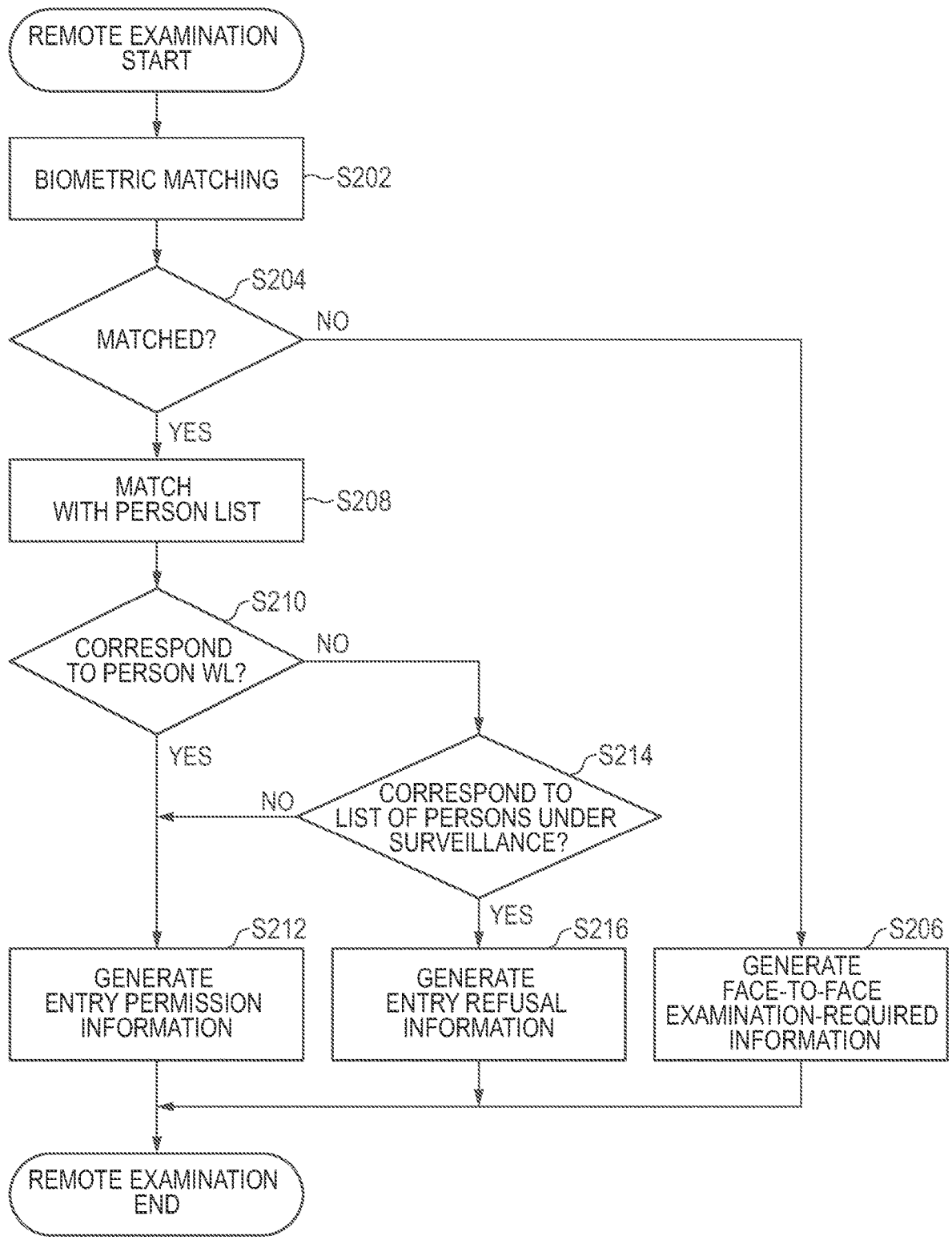
FIG. 10 is a flowchart illustrating the operation of a remote examination performed by the examination server according to one example embodiment of the present invention.

First, the operation of the remote examination terminal 10 will be described together with the operation of the examination server 20 with reference to FIG. 9 and FIG. 10. FIG. 9 is a sequence diagram illustrating the operation of the remote examination terminal 10 and the examination server 20. FIG. 10 is a flowchart illustrating the operation of a remote examination performed by the examination server 20.

The user U who is scheduled to travel from the first country to the second country by air completes an immigration examination to have departure confirmation in the departure examination site DA12 in the airport DA of the first country, then enters the restricted area DA14, and waits for boarding an airplane from the boarding gate DA16. The user U who has completed the departure examination can use the remote examination terminal 10 installed in a lounge, a boarding waiting room, a pathway, or the like in the restricted area DA14.

As illustrated in FIG. 9, the medium reading device 112 of the remote examination terminal 10 determines whether or not the user U's passport is held over the reading unit thereof (step S102) and stands by until the passport is held over (step S102, NO).

If the medium reading device 112 determines that the passport is held over (step S102, YES), the medium reading device 112 reads and acquires identity information on the user U from the held over passport (step S104). The identity information includes passport information. Further, the medium reading device 112 also acquires information such as a passport face image, a passport fingerprint image, or the like of the user U recorded in the passport.

Next, the medium reading device 112 determines whether or not a user U's airline ticket medium is held over the reading unit thereof (step S106) and stands by until the airline ticket medium is held over (step S106, NO).

If the medium reading device 112 determines that the airline ticket medium is held over (step S106, YES), the medium reading device 112 reads and acquires boarding information on the user U from the held over airline ticket medium (step S108).

Note that the order of step S104 of acquiring identity information and step S108 of acquiring boarding information is not limited to the case described above. Any step of steps S104 and S108 may be performed in the earlier order, or both steps S104 and S108 may be performed at the same time.

Next, the camera 114 of the remote examination terminal 10 captures the face of the user U placing a finger of his/her hand on the reading surface of the fingerprint scanner 116 of the remote examination terminal 10 to get a fingerprint read and acquires a captured face image of the user U (step S110). For example, the user U can place his/her finger on the reading surface of the fingerprint scanner 116 in accordance with guidance displayed on the display 110 of the remote examination terminal 10. The fingerprint scanner 116 reads the fingerprint of the finger placed on the reading surface and acquires a read fingerprint image of the user U (step S112).

In such a way, the acquisition of the captured face image performed by the camera 114 and the acquisition of the read fingerprint image performed by the fingerprint scanner 116 are performed in parallel. In such a way, with the acquisition operations of multiple types of biometric information on the user U being performed in parallel, impersonation of the user U in a non-biometric manner can be prevented as much as possible.

Note that step S110 of acquiring a captured face image and step S112 of acquiring a read fingerprint image may be performed before step S104 or S108 or may be performed between steps S104 and S108 either one of which is performed first.

Subsequently, the CPU 102 of the remote examination terminal 10 determines whether or not the user U is impersonated (step S114). For example, based on the status of acquisition of biometric information on the user U at step S110 or S112, an analysis result from a video of the remote examination terminal 10 and the periphery thereof captured by the monitoring camera 70, or the like, the CPU 102 can determine whether or not the user U is impersonated.

If the CPU 102 determines that impersonation is taking place (step S114, YES), the CPU 102 performs an alert process (step S116). The CPU 102 can perform display on the display 110, voice output from a speaker, transmission to an operation terminal or the like, or the like of an alert indicating a likelihood of impersonation being taking place, for example, as the alert process.

On the other hand, if the CPU 102 determines that no impersonation is taking place (step S114, NO), the CPU 102 transmits the user information on the user U to the examination server 20 via the network NW (step S118). The user information includes the identity information, face information, fingerprint information, and the boarding information on the user U associated with each other. The face information on the user U is the captured face image of the user U and the passport face image or face feature amounts extracted from both the face images. The fingerprint information on the user U includes the read fingerprint image of the user U or a fingerprint feature amount extracted from the read fingerprint image and may further include the passport fingerprint image of the user U or a fingerprint feature amount extracted from the passport fingerprint image.

In response to receiving the user information on the user U from the remote examination terminal 10, the CPU 202 of the examination server 20 determines whether or not the user is a subject of the remote examination based on the received user information (step S120). For example, the CPU 202 can determine whether or not the user U is a subject of the remote examination based on passage history information on the user U to the second country extracted from the passage history information DB 206a or passage history information on the user U to the second country included in the user information. Further, the CPU 202 can determine whether or not the user U is a subject of the remote examination based on a time period from the time the user information is acquired at the remote examination terminal 10 to the boarding time, for example. Further, the CPU 202 can determine whether or not the user U is a subject of the remote examination based on an airline company used by the user U acquired from the boarding information included in the user information, for example. Further, the CPU 202 can determine that the user U is a subject of the remote examination when the user U is a pre-registered user who has registered in advance to use a remote examination, for example.

If the CPU 202 determines that the user U is not a subject of the remote examination (step S120, NO), the CPU 202 generates a not-subject notification indicating that the user U is not a subject of the remote examination (step S122).

On the other hand, if the CPU 202 determines that the user U is a subject of the remote examination (step S120, YES), the CPU 202 registers the user information on the user U in the user information DB 206c (step S124).

Next, the CPU 202 performs an immigration examination at entry to the second country on the user U as a remote examination based on the user information on the user U registered in the user information DB 206c (step S126).

In the remote examination, first, the CPU 202 performs biometric matching using biometric information included in the user information on the user U, as illustrated in FIG. 10 (step S202). Accordingly, the CPU 202 performs identity verification of the user U. The CPU 202 can perform face matching to match the captured face image included in the user information with the passport face image included in the same user information, for example, as the biometric matching for identity verification. Further, the CPU 202 can perform fingerprint matching to match the read fingerprint image included in the user information with the passport fingerprint image included in the same user information, for example.

If the CPU 202 determines that the biometric matching has no matching and the identity verification of the user U failed (step S204, NO), the CPU 202 generates, as the examination information, the face-to-face examination-required information indicating that the user U is required to have a face-to-face examination (step S206).

On the other hand, if the CPU 202 determines that the biometric matching has a matching and the identity verification of the user U is successful (step S204, YES), the CPU 202 performs matching of the user U with a person list (step S208). In the matching with the person list, the CPU 202 matches, at 1:N, information that may identify the user U included in the user information on the user U with information on the same type of multiple persons included in the person WL or the list of persons under surveillance registered in the person list DB 206b. Accordingly, the CPU 202 determines whether or not the user U corresponds to a person registered in the person WL or the list of persons under surveillance (steps S210, S214).

First, the CPU 202 determines whether or not the user U corresponds to a person registered in the person WL (step S210). If the CPU 202 determines that the user U corresponds to a person registered in the person WL (step S210, YES), the CPU 202 generates, as examination information, the entry permission information indicating that the user U is permitted to enter the second country (step S212).

Furthermore, if the CPU 202 determines that the user U does not correspond to a person registered in the person WL (step S210, NO), the CPU 202 further determines whether or not the user U corresponds to a person registered in the list of persons under surveillance (step S214). If the CPU 202 determines that the user U does not correspond to a person registered in the list of persons under surveillance (step S214, NO), the CPU 202 similarly generates the entry permission information (step S212).

On the other hand, if the CPU 202 determines that the user U corresponds to a person registered in the list of persons under surveillance (step S214, YES), the CPU 202 generates the entry refusal information indicating that the user U is refused to enter the second country (step S216). Note that, in such a case, as the examination information, the CPU 202 may generate the face-to-face examination-required information instead of the entry refusal information in the same manner as the case where identity verification fails.

In such a way, the CPU 202 generates the entry permission information, the entry refusal information, or the face-to-face examination-required information as the examination information and ends the remote examination.

The CPU 202 that has completed the remote examination registers and manages the generated examination information in the examination information DB 206d (step S128) as illustrated in FIG. 9.

Next, the CPU 202 transmits the examination information or the not-subject notification, which is generated in accordance with whether or not the user U is a subject of the remote examination, to the remote examination terminal 10 via the network NW (step S130). Note that, if the remote examination is not completed while the user U is staying in front of the remote examination terminal 10, the CPU 202 can transmit acceptance completion information indicating that the user information used for the remote examination has been accepted, instead of the examination information, to the remote examination terminal 10.

In accordance with the examination information or the not-subject notification received from the examination server 20, the CPU 102 of the remote examination terminal 10 performs a notification process on the user U who used the remote examination terminal 10 (step S132).

If the examination information is received, the CPU 102 can notify the user U that the remote examination is completed by causing such a notification to be displayed on the display 110 or output by voice. Furthermore, in such a case, the CPU 102 can also cause a specific result of the remote examination to be displayed on the display 110 or output by voice to notify the user U in accordance with which of the entry permission information, the entry refusal information, or the face-to-face examination-required information the received examination information is. That is, if the received examination information is the entry permission information, the CPU 102 can also notify the user U that entry to the second country is permitted. Further, if the received examination information is the entry refusal information, the CPU 102 can also notify the user U that entry to the second country is refused. Further, if the received examination information is the face-to-face examination-required information, the CPU 102 can also notify the user U that a face-to-face examination is required for entry to the second country.

Furthermore, if the examination information is received, the CPU 102 causes the issuance device 118 to issue a ticket such as a piece of paper on which an examination completion code is printed. The user U may possess the issued ticket to travel to the second country.

Note that, if the acceptance completion information is received instead of the examination information, the CPU 102 can notify the user U that the user information used for the remote examination has been accepted by causing such a notification to be displayed on the display 110 or output by voice.

On the other hand, if the not-subject notification is received, the CPU 102 notifies the user U that the user U is not a subject of the remote examination by causing such a notification to be displayed on the display 110 or output by voice.

In such a way, the process for the user U who uses the remote examination terminal 10 is performed.

Figure 11:
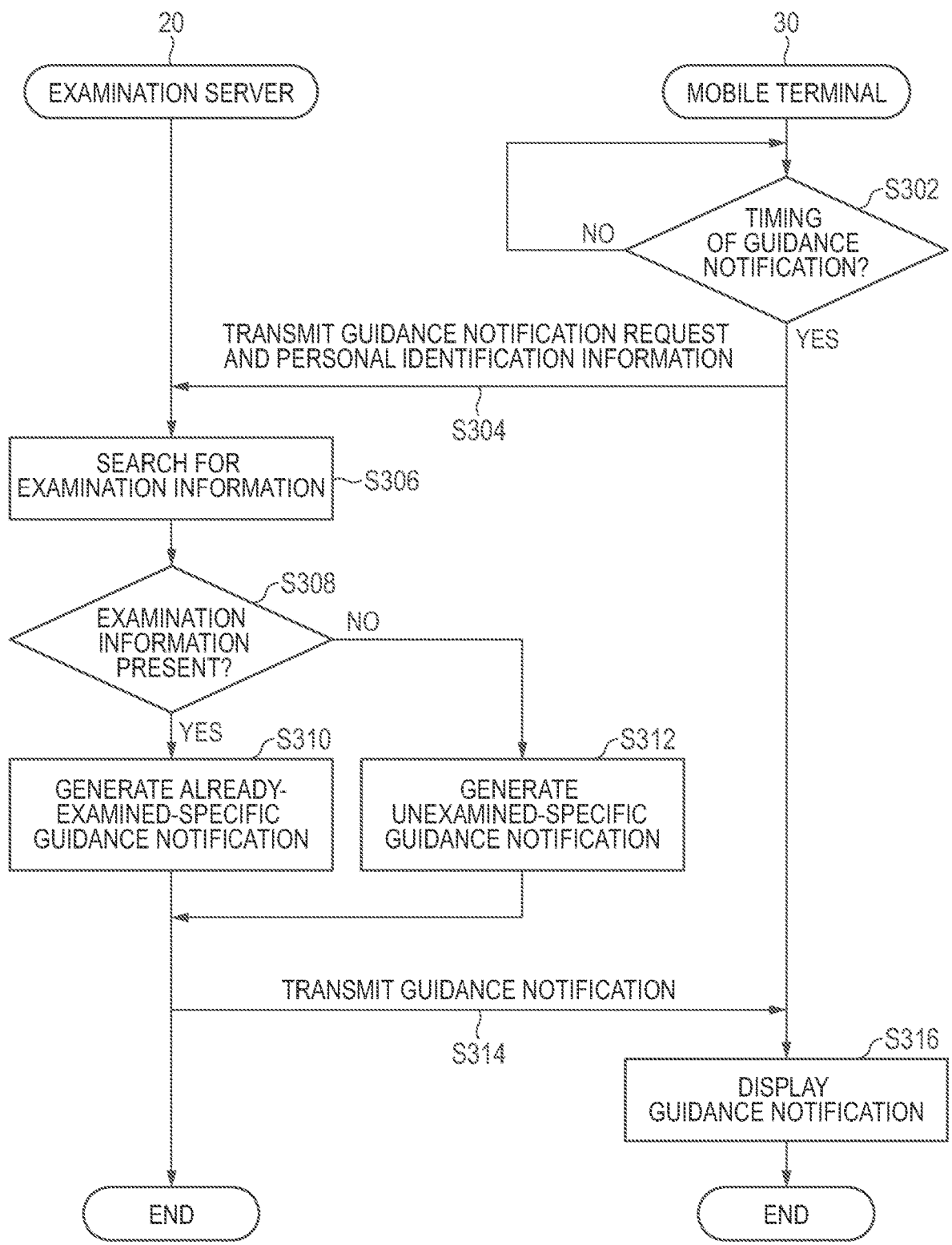
FIG. 11 is a sequence diagram illustrating the operation of the examination server and the mobile terminal in the information processing system according to one example embodiment of the present invention.
Figure 12A:
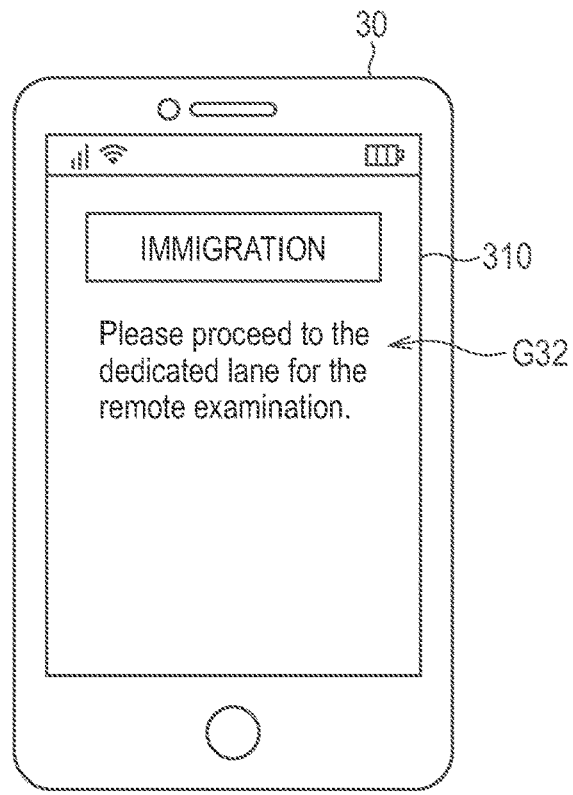
FIG. 12A is a schematic diagram illustrating an example of a guidance notification displayed on a mobile terminal according to one example embodiment of the present invention.
Figure 12B:
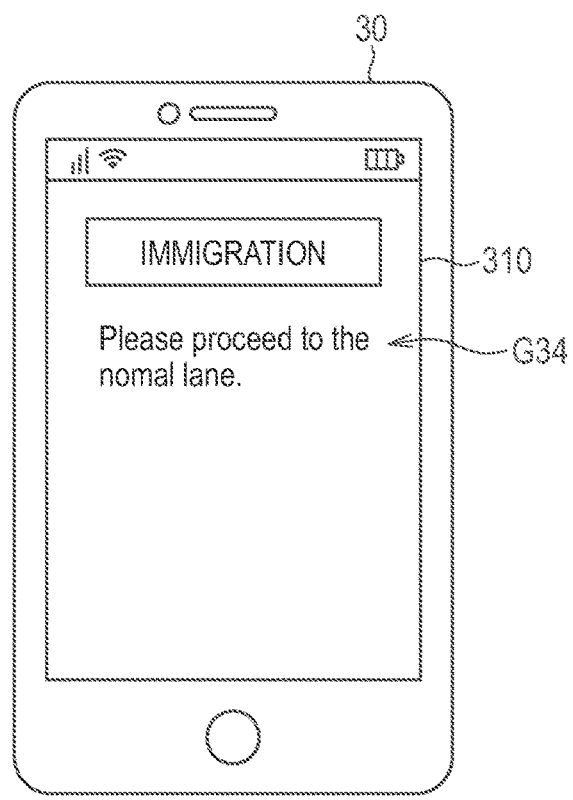
FIG. 12B is a schematic diagram illustrating an example of a guidance notification displayed on a mobile terminal according to one example embodiment of the present invention.

Next, the operation of the mobile terminal 30 will be described together with the operation of the examination server 20 with reference to FIG. 11, FIG. 12A, and FIG. 12B. FIG. 11 is a sequence diagram illustrating the operation of the examination server 20 and the mobile terminal 30. FIG. 12A and FIG. 12B are schematic diagrams illustrating examples of guidance notifications displayed on the mobile terminal 30.

The user U who used the remote examination terminal 10 boards an airplane from the boarding gate DA16 and travels by air to the second country. The user U can receive a guidance notification related to the remote examination from the examination server 20 at the mobile terminal 30 possessed or carried by the user U after using the remote examination terminal 10 and before reaching the immigration examination site AA16 of the airport AA of the second country.

As illustrated in FIG. 11, the CPU 302 of the mobile terminal 30 determines whether or not it is the timing that a guidance notification related to a remote examination should be received from the examination server 20 (step S302). If it is determined that it is not the timing that the guidance notification should be received (step S302, NO), the CPU 302 continuously performs the determination as to whether or not the guidance notification should be received and stands by for arrival of a particular notification timing.

The CPU 302 can determine that the timing that entry or landing of the user U to the second country is detected based on position information acquired by the position sensor 316 or terrestrial magnetism information acquired by the magnetic sensor 318 is the timing that the guidance notification should be received. Further, the CPU 302 can determine that the timing that the user U approaching the immigration examination site AA16 is detected by indoor positioning is the timing that the guidance notification should be received. Note that the CPU 302 can perform indoor positioning based on terrestrial magnetism information acquired by the magnetic sensor 318, a beacon signal received by the short-range wireless communication unit 314, or the like, for example. Further, the CPU 302 can determine whether or not it is the timing that the guidance notification should be received based on a date and time set in advance. Further, the CPU 302 can determine that the timing that the immigration-related application program is executed at the mobile terminal 30 or the timing that a particular operation is performed in the immigration-related application program is the timing that the guidance notification should be received. Further, the CPU 302 can determine that the timing that an instruction to receive the guidance notification is input by the user U is the timing that the guidance notification should be received.

If the CPU 302 determines that it is the time that the guidance notification should be received (step S302, YES), at this timing, the CPU 302 transmits a guidance notification request, which requests the guidance notification, to the examination server 20 via the network NW (step S304). The CPU 302 transmits the guidance notification request together with the personal identification information on the user U who uses the mobile terminal 30. As the personal identification information on the user U, the CPU 302 can use a user U's passport number or the like stored in the storage device 306 input via the immigration support application, for example.

In response to receiving the guidance notification request from the mobile terminal 30, based on the personal identification information on the user U received together with the guidance notification request, the CPU 202 of the examination server 20 searches the examination information DB 206d for examination information associated with this personal identification information (step S306).

If the CPU 202 finds examination information on the user U in the examination information DB 206d as the result of the search (step S308, YES), the CPU 202 generates an already-examined-specific guidance notification indicating that the remote examination is completed (step S310). The CPU 202 can generate a guidance notification indicating explicitly or directly or indicating implicitly or indirectly that the remote examination is completed. Further, in accordance with which of the entry permission information, the entry refusal information, or the face-to-face examination-required information the examination information is, the CPU 202 can generate an already-examined-specific guidance notification also including the content indicated by each of the above.

On the other hand, if the CPU 202 does not find examination information on the user U in the examination information DB 206d as the result of the search (step S308, NO), the CPU 202 generates an unexamined-specific guidance notification indicating that the remote examination has not been provided (step S312). The CPU 202 can generate a guidance notification indicating explicitly or directly or indicating implicitly or indirectly that the remote examination has not been provided.

Next, the CPU 202 transmits the generated already-examined-specific or unexamined-specific guidance notification to the mobile terminal 30 that has transmitted the guidance notification request via the network NW (step S314).

In response to receiving the already-examined-specific or unexamined-specific guidance notification from the examination server 20, the CPU 302 of the mobile terminal 30 causes the display 310 to display the content of the received already-examined-specific or unexamined-specific guidance notification (step S316). The CPU 302 can use a language set in the language setting of the mobile terminal 30 to display the content of the guidance notification, for example.

FIG. 12A illustrates an example of a window of the display 310 of the mobile terminal 30 that displays the already-examined-specific guidance notification implicitly or indirectly indicating that the remote examination is completed. As illustrated in FIG. 12A, the display 310 of the mobile terminal 30 displays guidance G32 that guides the user U to the remote examination dedicated lane L1 and then to the automated gate apparatus 60 in the immigration examination site AA16 as the content of the already-examined-specific guidance notification. The guidance G32 indicating the already-examined-specific guidance notification indicates that the remote examination is completed, implicitly or indirectly, with the guidance to guide the user U to the remote examination dedicated lane L1.

On the other hand, FIG. 12B illustrates an example of a window of the display 310 of the mobile terminal 30 that displays the unexamined-specific guidance notification implicitly or indirectly indicating that the remote examination has not been provided. As illustrated in FIG. 12B, the display 310 of the mobile terminal 30 displays guidance G34 that guides the user U to the normal lane L2 and then to the examination booth B in the immigration examination site AA16 as the unexamined-specific guidance notification. The guidance G34 indicating the unexamined-specific guidance notification indicates that the remote examination has not been provided, implicitly or indirectly, with the guidance to guide the user U to the normal lane L2.

In such a way, the user U can receive a guidance notification related to a remote examination at the mobile terminal 30. The user U who views the guidance notification displayed on the mobile terminal 30 may take an action in accordance with the guidance notification when moving to the immigration examination site AA16.

Figure 13:
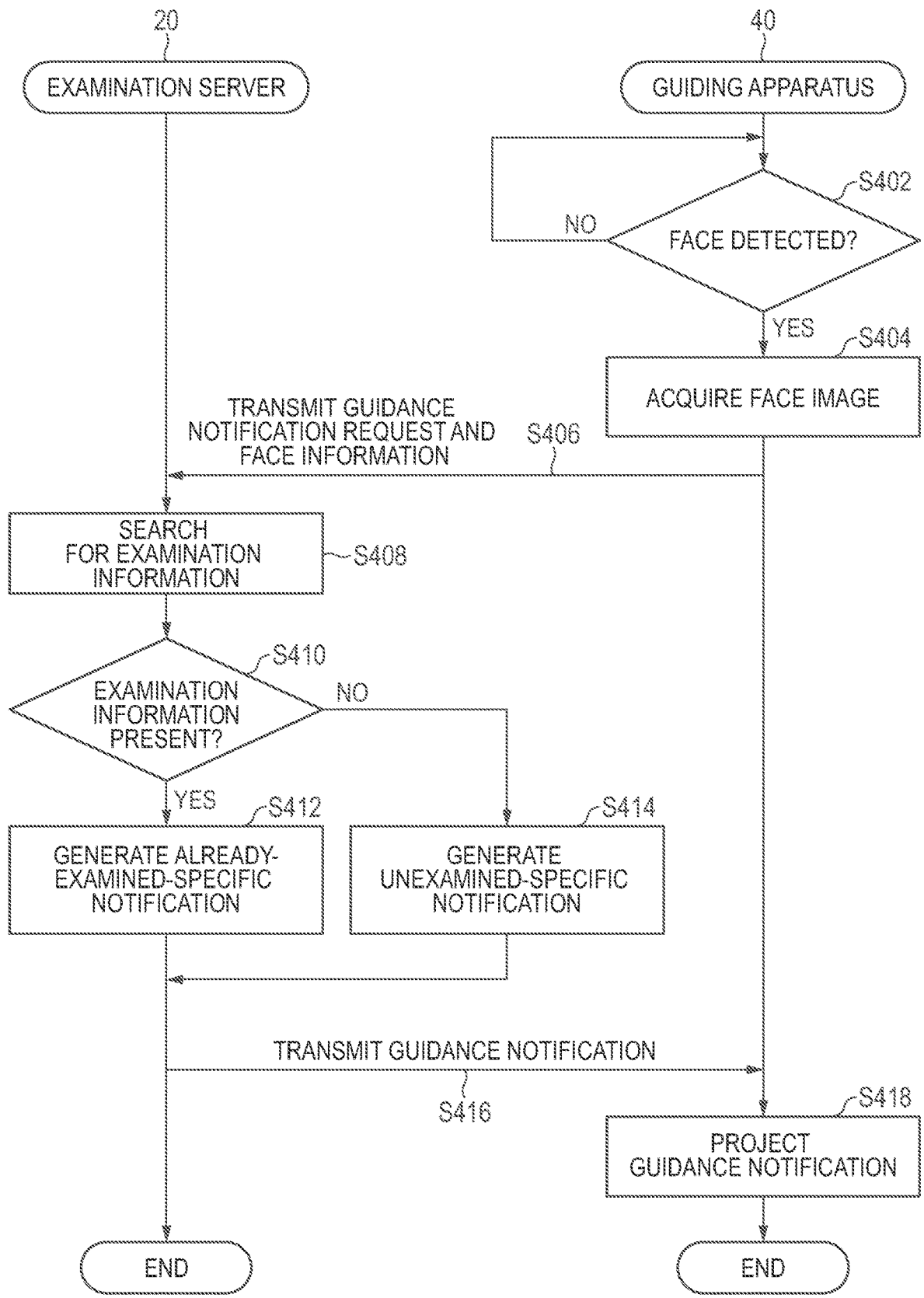
FIG. 13 is a sequence diagram illustrating the operation of the examination server and the guiding apparatus in the information processing system according to one example embodiment of the present invention.
Figure 14A:
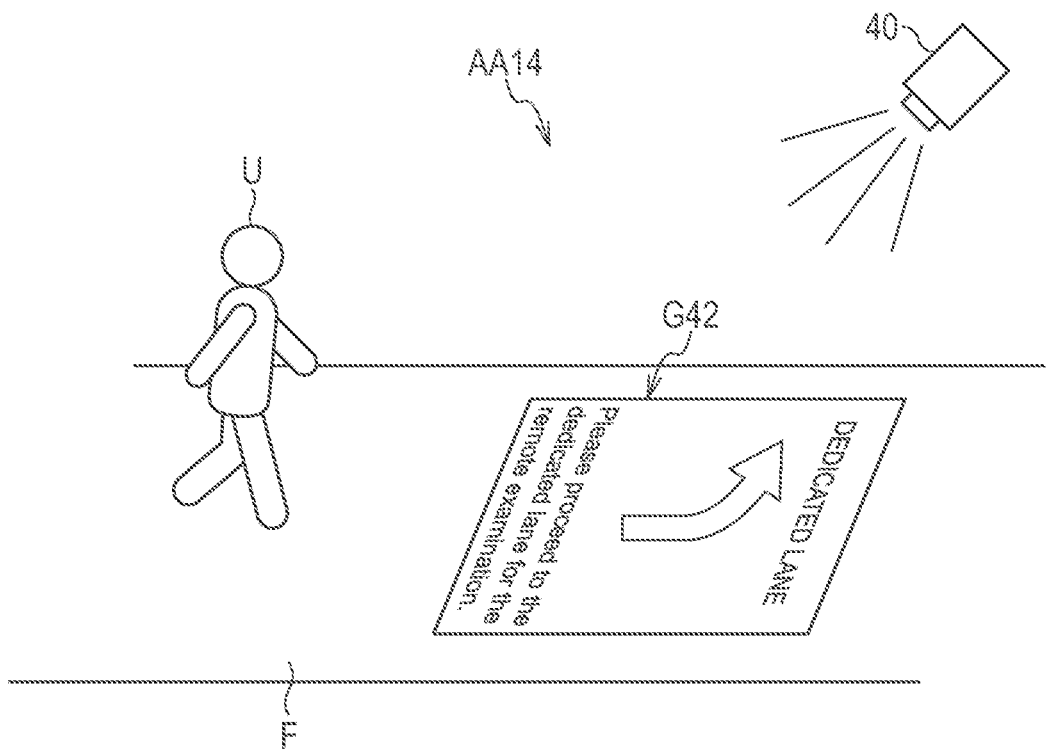
FIG. 14A is a schematic diagram illustrating an example of a guidance notification projected by the guiding apparatus according to one example embodiment of the present invention.
Figure 14B:
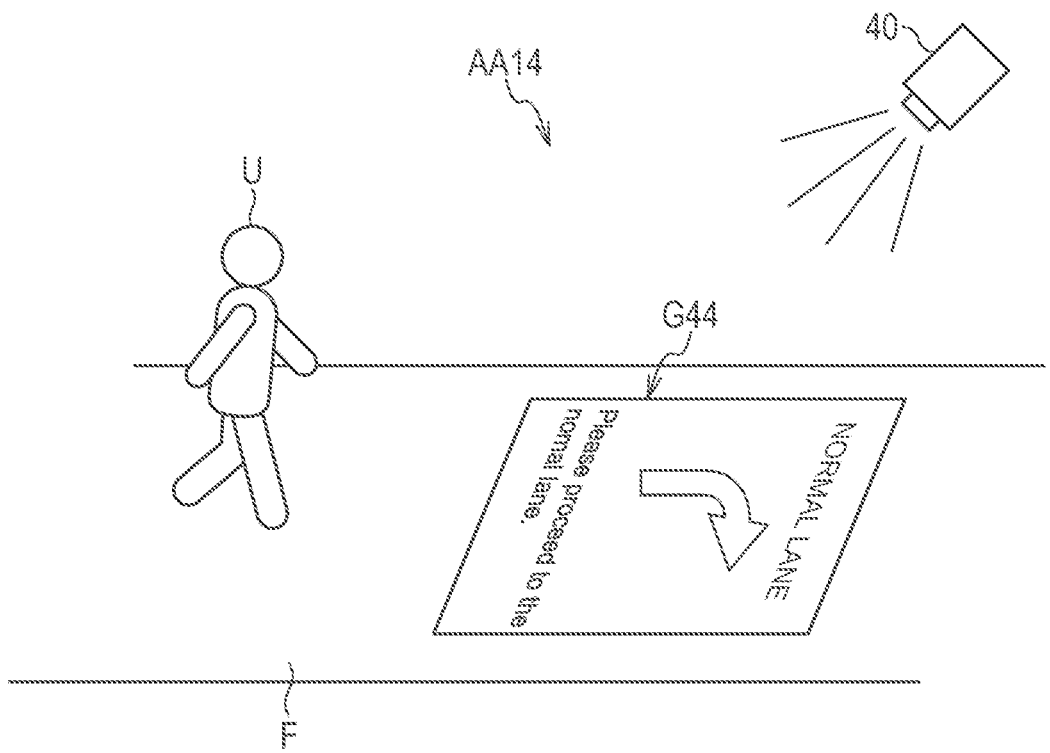
FIG. 14B is a schematic diagram illustrating an example of a guidance notification projected by the guiding apparatus according to one example embodiment of the present invention.

Next, the operation of the guiding apparatus 40 will be described together with the operation of the examination server 20 with reference to FIG. 13, FIG. 14A, and FIG. 14B. FIG. 13 is a sequence diagram illustrating the operation of the examination server 20 and the guiding apparatus 40. FIG. 14A and FIG. 14B are schematic diagrams illustrating examples of guidance notifications projected by the guiding apparatus 40.

The user U who has arrived at the airport AA of the second country by air moves to the immigration examination site AA16 via the quarantine site AA12 that provides a quarantine procedure, for example. During this movement, the user U passes through the pathway AA14 that is a pathway connecting the quarantine site AA12 to the immigration examination site AA16, for example.

As illustrated in FIG. 13, the camera 408 of the guiding apparatus 40 continuously or periodically captures the pathway AA14 and determines whether or not the face of the user U is detected in the captured image (step S402). The camera 408 stands by until the face of the user U is detected in the image (step S402, NO).

If the camera 408 determines that the face of the user U is detected (step S402, YES), the camera 408 captures a face of the user U and acquires a face image of the user U (step S404). In such a way, the guiding apparatus 40 detects the user U passing through the pathway AA14.

Next, the CPU 402 of the guiding apparatus 40 that has detected the user U transmits a guidance notification request, which requests a guidance notification, to the examination server 20 via the network NW (step S406). The CPU 402 transmits the guidance notification request together with the face information on the user U that is a face image of the user U detected and captured by the camera 408 or a face feature amount extracted from the face image.

In response to receiving the guidance notification request from the guiding apparatus 40, based on the face information on the user U received together with the guidance notification request, the CPU 202 of the examination server 20 searches the examination information DB 206d for examination information associated with this face information (step S408).

If the CPU 202 finds examination information in the examination information DB 206d for the user U as the result of the search (step S410, YES), the CPU 202 generates the already-examined-specific guidance notification in the same manner as step S310 (step S412).

On the other hand, if the CPU 202 does not find examination information in the examination information DB 206d for the user U as the result of the search (step S410, NO), the CPU 202 generates the unexamined-specific guidance notification in the same manner as step S312 (step S414).

Next, the CPU 202 transmits the generated already-examined-specific or unexamined-specific guidance notification via the network NW to the guiding apparatus 40 that has transmitted the guidance notification request (step S416).

In response to receiving the already-examined-specific or unexamined-specific guidance notification from the examination server 20, the CPU 402 of the guiding apparatus 40 causes the projector 410 to project the content of the received already-examined-specific or unexamined-specific guidance notification on the floor F of the pathway AA14 (step S418). The CPU 402 can use a language in accordance with the nationality of the user U identified by the user information to display the content of the guidance notification, for example.

FIG. 14A illustrates an example of the floor F of the pathway AA14 on which the content of the already-examined-specific guidance notification implicitly or indirectly indicating that the remote examination is completed is projected by the guiding apparatus 40. As illustrated in FIG. 14A, the projector 410 of the guiding apparatus 40 displays guidance G42 that guides the user U to the remote examination dedicated lane L1 and then to the automated gate apparatus 60 in the immigration examination site AA16 as the content of the already-examined-specific guidance notification. The guidance G42 may include guidance display such as an arrow pointing to the place of the remote examination dedicated lane L1. The guidance G42 can be formed of a static image, a moving image, or the like. The guidance G42 indicating the already-examined-specific guidance notification indicates that the remote examination is completed, implicitly or indirectly, with the guidance to guide the user U to the remote examination dedicated lane L1.

On the other hand, FIG. 14B illustrates an example of the floor F of the pathway AA14 on which the content of the unexamined-specific guidance notification implicitly or indirectly indicating that the remote examination has not been provided is projected by the guiding apparatus 40. As illustrated in FIG. 14B, the projector 410 of the guiding apparatus 40 displays guidance G44 that guides the user U to the normal lane L2 and then to the examination booth B in the immigration examination site AA16 as the unexamined-specific guidance notification. The guidance G44 may include guidance display such as an arrow pointing to the place of the normal lane L2. The guidance G44 can be formed of a static image, a moving image, or the like. The guidance G44 indicating the unexamined-specific guidance notification indicates that the remote examination has not been provided, implicitly or indirectly, with the guidance to guide the user U to the normal lane L2.

In such a way, the user U can receive a guidance notification related to a remote examination when passing through the pathway AA14. The user U who views the guidance notification projected on the floor F of the pathway AA14 may take an action in accordance with the guidance notification when moving to the immigration examination site AA16.

In particular, when the pathway AA14 in which a guidance notification is projected on the floor F by the guiding apparatus 40 is a narrow pathway such as a pathway connecting the quarantine site AA12 to the immigration examination site AA16, the user U can reliably view the content of the guidance notification projected on the floor F.

Figure 15:
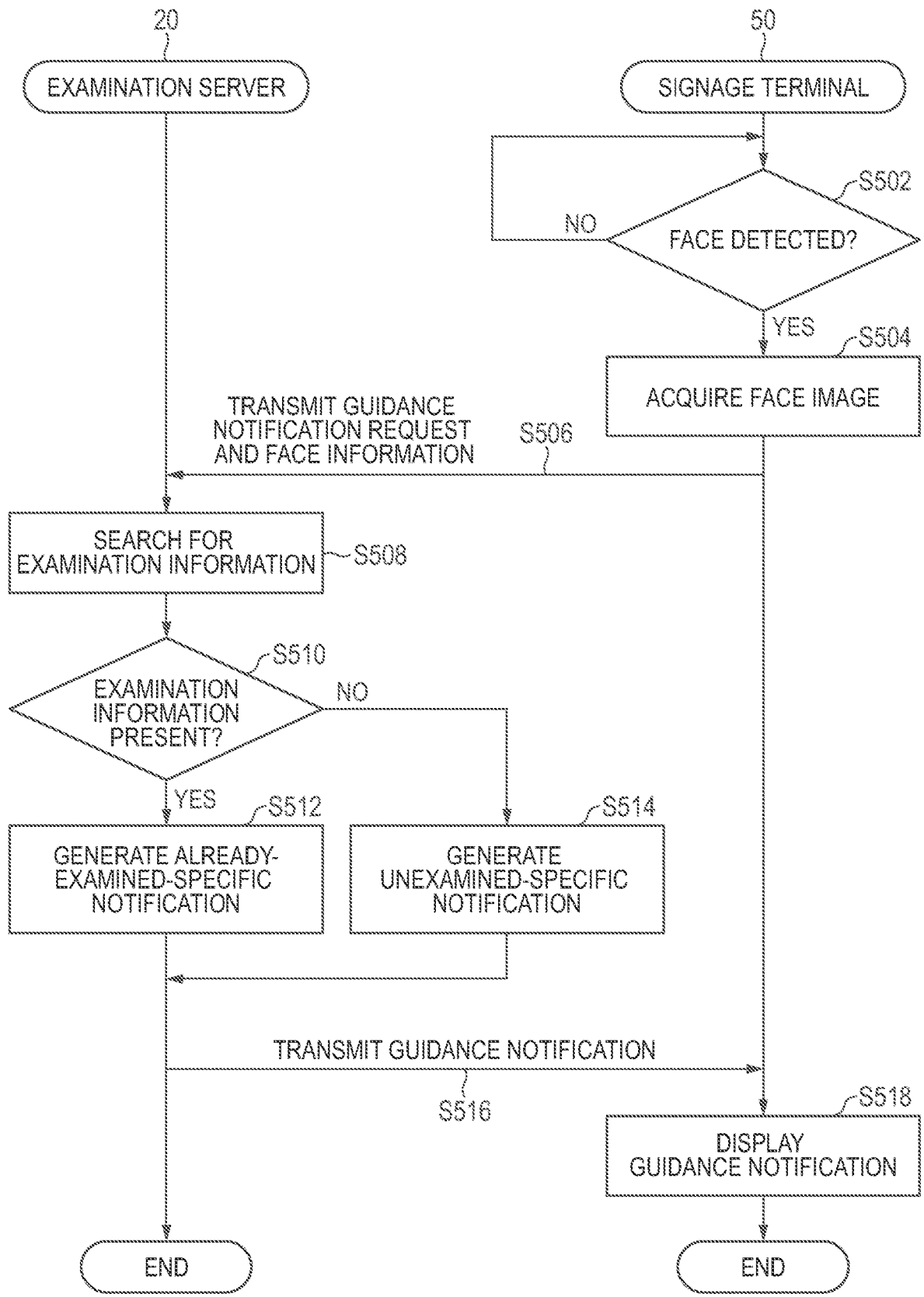
FIG. 15 is a sequence diagram illustrating the operation of the examination server and the signage terminal in the information processing system according to one example embodiment of the present invention.
Figure 16A:
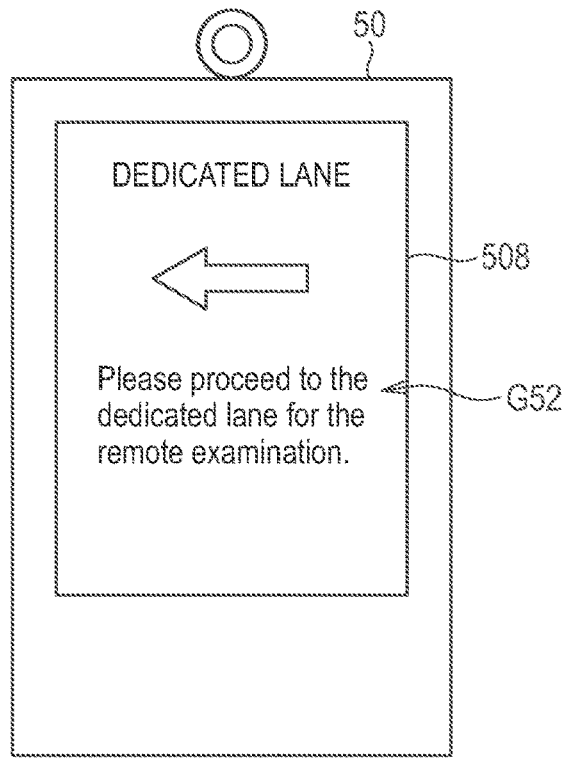
FIG. 16A is a schematic diagram illustrating an example of a guidance notification displayed on the signage terminal according to one example embodiment of the present invention.
Figure 16B:
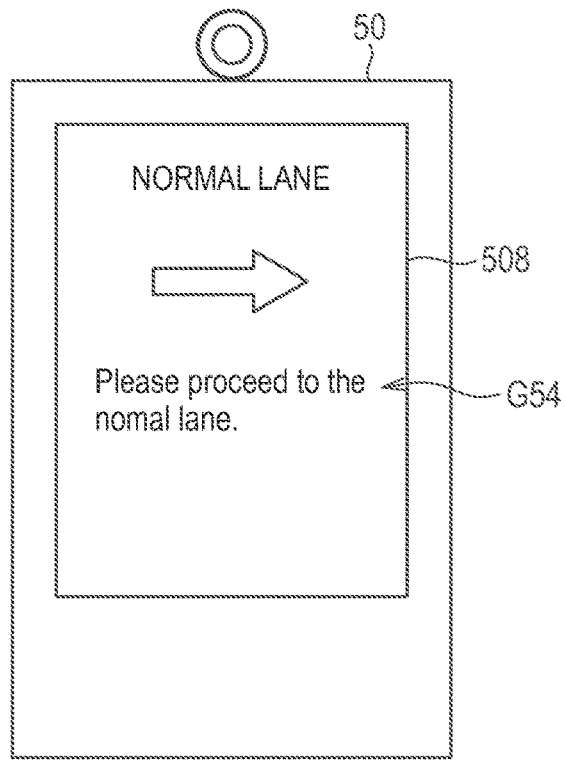
FIG. 16B is a schematic diagram illustrating an example of a guidance notification displayed on the signage terminal according to one example embodiment of the present invention.

Next, the operation of the signage terminal 50 will be described together with the operation of the examination server 20 with reference to FIG. 15, FIG. 16A, and FIG. 16B. FIG. 15 is a sequence diagram illustrating the operation of the examination server 20 and the signage terminal 50. FIG. 16A and FIG. 16B are schematic diagrams illustrating examples of guidance notifications displayed on the signage terminal 50.

The user U who has arrived at the airport AA of the second country by air passes in front of the signage terminals 50 installed at various places of the airport AA from the arrival port to the immigration examination site AA16 while moving to the immigration examination site AA16. Further, the user U may view an advertisement, route guidance, or the like displayed on the signage terminal 50 in front of the signage terminal 50.

As illustrated in FIG. 15, the camera 510 of the signage terminal 50 continuously or periodically captures the area in front of the signage terminal 50 and determines whether or not the face of the user U is detected in the captured image (step S502). The camera 510 stands by until the face of the user U is detected in the image (step S502, NO).

If the camera 510 determines that the face of the user U is detected (step S502, YES), the camera 510 captures the face of the user U and acquires a face image of the user U (step S504). In such a way, the signage terminal 50 detects the user U in front of the signage terminal 50.

Next, the CPU 502 of the signage terminal 50 that has detected the user U transmits a guidance notification request, which requests a guidance notification, to the examination server 20 via the network NW (step S506). The CPU 502 transmits the guidance notification request together with the face information on the user U that is a face image of the user U detected and captured by the camera 510 or a face feature amount extracted from the face image.

In response to receiving the guidance notification request from the signage terminal 50, based on the face information on the user U received together with the guidance notification request, the CPU 202 of the examination server 20 searches the examination information DB 206d for examination information associated with this face information (step S508).

If the CPU 202 finds examination information in the examination information DB 206d for the user U as the result of the search (step S510, YES), the CPU 202 generates the already-examined-specific guidance notification in the same manner as step S310 (step S512).

On the other hand, if the CPU 202 does not find examination information in the examination information DB 206d on the user U as the result of the search (step S510, NO), the CPU 202 generates the unexamined-specific guidance notification in the same manner as step S312 (step S514).

Next, the CPU 202 transmits the generated already-examined-specific or unexamined-specific guidance notification via the network NW to the signage terminal 50 that has transmitted the guidance notification request (step S516).

In response to receiving the already-examined-specific or unexamined-specific guidance notification from the examination server 20, the CPU 502 of the signage terminal 50 causes the display 508 to display the content of the received already-examined-specific or unexamined-specific guidance notification (step S518). The CPU 502 can use a language in accordance with the nationality of the user U identified by the user information to display the content of the guidance notification, for example.

FIG. 16A illustrates an example of a window of the display 508 of the signage terminal 50 that displays the already-examined-specific guidance notification implicitly or indirectly indicating that the remote examination is completed. As illustrated in FIG. 16A, the display 508 of the signage terminal 50 displays guidance G52 that guides the user U to the remote examination dedicated lane L1 and then to the automated gate apparatus 60 in the immigration examination site AA16 as the content of the already-examined-specific guidance notification. The guidance G52 may include guidance display such as an arrow pointing to the place of the remote examination dedicated lane L1. The guidance G52 can be formed of a static image, a moving image, or the like. The guidance G52 indicating the already-examined-specific guidance notification indicates that the remote examination is completed, implicitly or indirectly, with the guidance to guide the user U to the remote examination dedicated lane L1.

On the other hand, FIG. 16B illustrates an example of a window of the display 508 of the signage terminal 50 that displays the unexamined-specific guidance notification implicitly or indirectly indicating that the remote examination has not been provided. As illustrated in FIG. 16B, the display 508 of the signage terminal 50 displays guidance G54 that guides the user U to the normal lane L2 and then to the examination booth B in the immigration examination site AA16 as the content of the examined-specific guidance notification as the unexamined-specific guidance notification. The guidance G54 may include guidance display such as an arrow pointing to the place of the normal lane L2. The guidance G54 can be formed of a static image, a moving image, or the like. The guidance G54 indicating the unexamined-specific guidance notification indicates that the remote examination has not been provided, implicitly or indirectly, with the guidance to guide the user U to the normal lane L2.

In such a way, the user U can receive a guidance notification related to a remote examination at the signage terminal 50. The user U who views the guidance notification displayed on the signage terminal 50 may take an action in accordance with the guidance notification when moving to the immigration examination site AA16.

Figure 17:
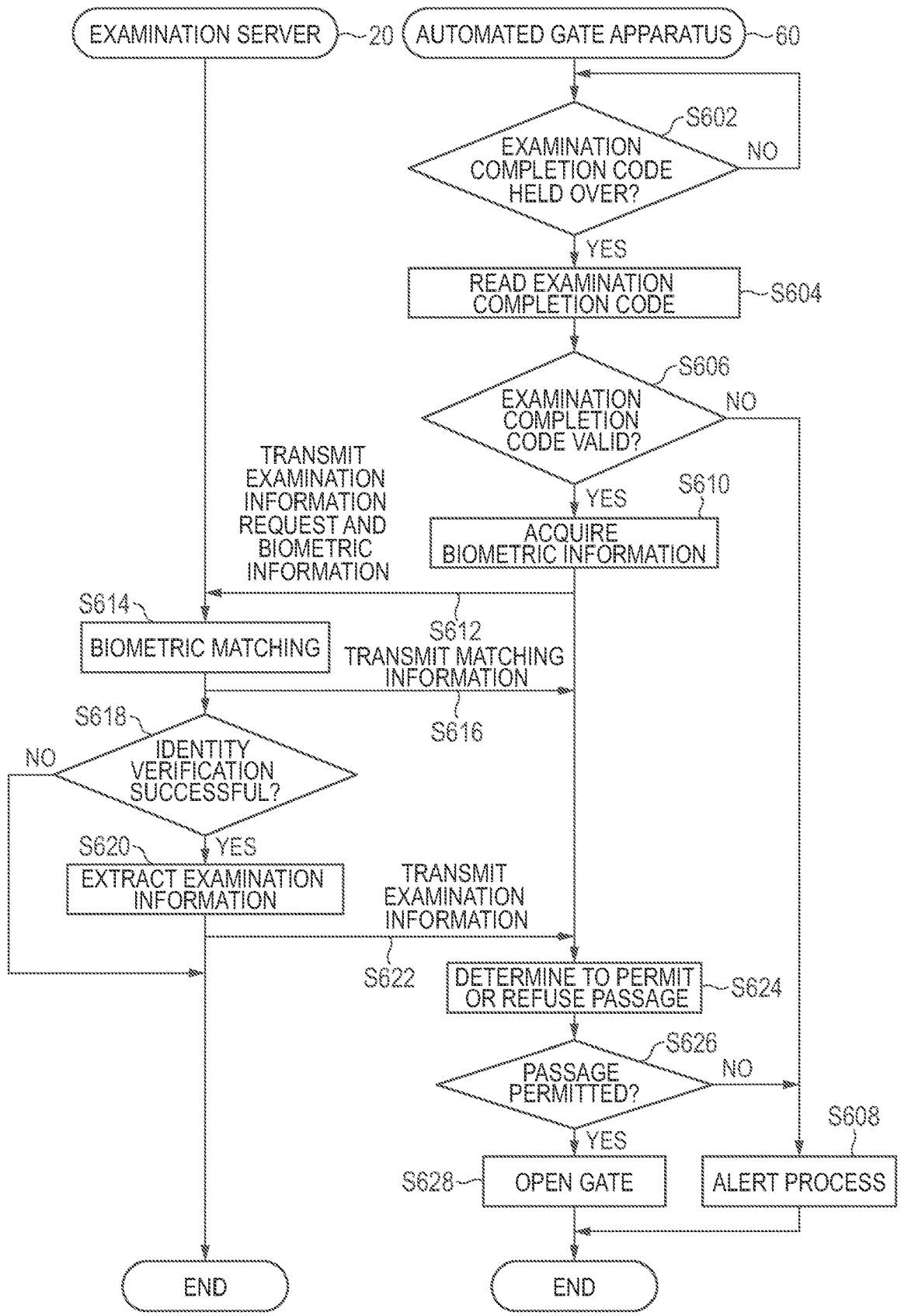
FIG. 17 is a sequence diagram illustrating the operation of the examination server and the automated gate apparatus in the information processing system according to one example embodiment of the present invention.

Next, the operation of the automated gate apparatus 60 will be described together with the operation of the examination server 20 with reference to FIG. 17. FIG. 17 is a sequence diagram illustrating the operation of the examination server 20 and the automated gate apparatus 60.

The user U who has completed the remote examination lines up in the remote examination dedicated lane L1 in the immigration examination site AA16 voluntarily or in accordance with the already-examined-specific guidance notification received as described above. The user U who has lined up in the remote examination dedicated lane L1 can pass through the automated gate apparatus 60 installed at the exit of the remote examination dedicated lane L1 and exit the immigration examination site AA16. The automated gate apparatus 60 permits or refuses the user U to pass through the automated gate apparatus 60 based on the matching information related to the user U, the examination information on the user U already generated by the examination server 20, or the like. Note that, during standby, the gate 616 of the automated gate apparatus 60 is in a closed state that blocks passage of the user U.

As illustrated in FIG. 17, the medium reading device 612 of the automated gate apparatus 60 determines whether or not an examination completion code is held over the reading unit by the user U (step S602) and stands by until an examination completion code is held over (step S602, NO). The examination completion code is a code printed on a ticket issued by the issuance device 118 of the remote examination terminal 10, a code displayed on the mobile terminal 30 of the user U, or the like, for example.

If the medium reading device 612 determines that the examination completion code is held over (S602, YES), the medium reading device 612 reads and acquires information from the held over examination completion code (step S604).

Next, the CPU 602 of the automated gate apparatus 60 determines whether or not the examination completion code read by the medium reading device 612 is valid (step S606). If the examination completion code includes examination completion information, the CPU 602 determines that the examination completion code is valid. Even in such a case, however, when the term of validity of the examination completion code has passed or when there is a history that a onetime valid examination completion code has been read, the CPU 602 determines that the examination completion code is invalid. Further, if the examination completion code includes no examination completion information, the CPU 602 determines that the examination completion code is invalid.

If the CPU 602 determines that the examination completion code is invalid (step S606, NO), the CPU 602 performs an alert process (step S608). As the alert process, the CPU 602 can perform display on the display 610, voice output from a speaker, transmission to an operation terminal or the like, or the like of an alert indicating that the examination completion code is invalid.

On the other hand, if the CPU 602 determines that the examination completion code is valid (step S606, YES), the CPU 602 causes the biometric information acquisition device 614 to acquire biometric information on the user U (step S610). The biometric information acquisition device 614 can acquire one type or multiple types of biometric information of a face image, a fingerprint image, or the like of the user U under the control of the CPU 602.

Note that it may be possible to omit step S602, S604, or S606 described above and not to use the examination completion code. In such a case, in response to detecting the user U in front of the automated gate apparatus 60, the biometric information acquisition device 614 acquires biometric information on the user U. For example, in response to detecting a face of a user U in a continuously or periodically captured image of an area in front of the automated gate apparatus 60, the camera as the biometric information acquisition device 614 captures the face of the user U and acquires a face image of the user U as the biometric information.

Next, the CPU 602 transmits an examination information request, which requests examination information, to the examination server 20 via the network NW together with the biometric information on the user U (step S612). The CPU 602 can transmit face information that is a face image of the user U acquired by a camera as the biometric information acquisition device 614 or a face feature amount extracted from the face image, for example, as the biometric information. Further, the CPU 602 can transmit fingerprint information that is the fingerprint image of the user U acquired by a fingerprint scanner as the biometric information acquisition device 614, a fingerprint feature amount extracted from the fingerprint image, or the like, for example, as the biometric information.

If the biometric information on the user U who intends to pass through the automated gate apparatus 60 is received from the automated gate apparatus 60, the CPU 202 of the examination server 20 performs biometric matching using the received biometric information (step S614). Accordingly, the CPU 202 performs identity verification of the user U. The CPU 202 matches, at 1:N, the biometric information received from the automated gate apparatus 60 with the biometric information included in the user information registered in the user information DB 206c. If user information including biometric information that matches the biometric information received from the automated gate apparatus 60 is found in the user information DB 206c as the result of the biometric matching, the CPU 202 determines that the identity verification of the user U is successful. On the other hand, if no user information including biometric information that matches the biometric information received from the automated gate apparatus 60 is found in the user information DB 206c as the result of the biometric matching, the CPU 202 determines that the identity verification of the user U failed.

Next, the CPU 202 transmits matching information indicating the result of the identity verification from the biometric matching for the user U to the automated gate apparatus 60 via the network NW (step S616).

Further, if the CPU 202 determines that the identity verification of the user U is successful (step S618, YES), the CPU 202 extracts the examination information on the user U from the examination information DB 206d (step S620). The CPU 202 can extract examination information associated with biometric information that matches the biometric information on the user U received from the automated gate apparatus 60 or the user information including the matching biometric information, for example. Further, the CPU 202 can also extract examination information associated with the personal identification information on the user U received from the automated gate apparatus 60, for example.

Note that, if the CPU 202 determines that the identity verification of the user U failed (step S618, NO), since no examination information on the user U is present in the examination information DB 206d, the CPU 202 does not perform extraction of the examination information.

Next, the CPU 202 transmits the examination information extracted from the examination information DB 206d via the network NW to the automated gate apparatus 60 that has transmitted the examination information request (step S622).

The CPU 602 of the automated gate apparatus 60 determines passage permission as to whether or not to permit the user U to pass through the automated gate apparatus 60 based on the matching information and the examination information on the user U received from the examination server 20 (step S624). If the matching information indicates that the identity verification of the user U is successful and the examination information is the entry permission information, the CPU 602 determines to permit the user U to pass through the automated gate apparatus 60. On the other hand, if the matching information indicates that the identity verification of the user U failed, the CPU 602 determines not to permit the user U to pass through the automated gate apparatus 60. Further, if the matching information indicates that the identity verification of the user U is successful and the examination information is the entry refusal information or the face-to-face examination-required information, the CPU 602 determines not to permit the user U to pass through the automated gate apparatus 60.

If the CPU 602 determines to permit the user U to pass through the automated gate apparatus 60 (step S626, YES), the CPU 602 controls the gate 616 to open the gate 616 from a closed state to an opened state (step S628). Accordingly, the CPU 602 permits the user U to pass through the gate 616.

On the other hand, if the CPU 602 determines not to permit the user U to pass through the automated gate apparatus 60 (step S626, NO), the CPU 602 performs an alert process (step S608). As the alert process, the CPU 602 can perform display on the display 610, voice output from a speaker, transmission to an operation terminal or the like, or the like of an alert indicating that passage through the automated gate apparatus 60 is not permitted. Note that, in such a case, the CPU 602 maintains the closed state of the gate 616.

In such a way, the user U is permitted or refused to pass through the automated gate apparatus 60 based on the matching information and the examination information. The user U permitted to pass through the automated gate apparatus 60 passes through the automated gate apparatus 60 and exits the immigration examination site AA16. On the other hand, for the user U not permitted to pass through the automated gate apparatus 60, a measure is taken so that the user U is guided to the examination booth B by the staff in order to additionally have a face-to-face examination with the examiner E or the like, for example.

As described above, according to the present example embodiment, the remote examination terminal 10 acquires user information related to the user U from the user U who has completed a departure examination of the first country but not started boarding for the second country, and the examination server 20 performs an immigration examination of the second country as a remote examination based on such user information. Therefore, according to the present example embodiment, the immigration examination of the second country can be efficiently performed. [Another Example Embodiment]

Figure 18:
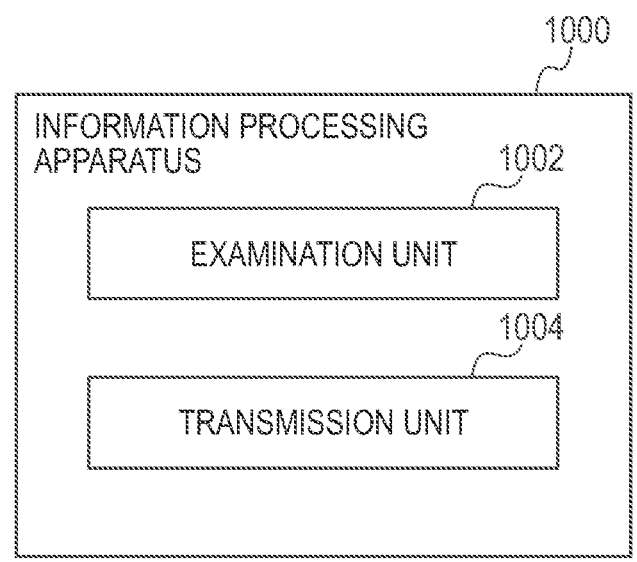
FIG. 18 is a block diagram illustrating a configuration of an information processing apparatus according to another example embodiment of the present invention.

The information processing apparatus described in the above example embodiment can also be configured as illustrated in FIG. 18 according to another example embodiment. FIG. 18 is a block diagram illustrating the configuration of the information processing apparatus according to another example embodiment.

As illustrated in FIG. 18, an information processing apparatus 1000 according to another example embodiment has an examination unit 1002 that performs an immigration examination of a second country based on user information acquired from a user who completed a departure examination of the first country but has not started boarding for the second country and related to the user. Further, the information processing apparatus 1000 has a transmission unit 1004 that transmits a notification related to an immigration examination.

In the information processing apparatus 1000 according to another example embodiment, an immigration examination of the second country is performed based on user information acquired from a user who completed a departure examination of the first country but has not started boarding for the second country and related to the user. Thus, according to another example embodiment, an immigration examination of the second country can be efficiently performed. [Modified Example Embodiment]

The present invention is not limited to the example embodiments described above, and various modifications are possible.

For example, although the case where the user U operates the remote examination terminal 10 by himself/herself has been described as an example in the above example embodiment, the present invention is not limited thereto. For example, the remote examination terminal 10 can also be configured to be operated by the user U with assistance of an attendant or operated by an attendant.

Further, although the case where the user U who has completed a remote examination is guided to the remote examination dedicated lane L1 and then guided to the automated gate apparatus 60 has been described as an example in the above example embodiments, the present invention is not limited thereto. The automated gate apparatus 60 is not necessarily required to be installed at the exit of the remote examination dedicated lane L1. For example, an examination booth in which a simple immigration examination is provided by an examiner in a face-to-face manner for the user U who has completed a remote examination may be installed at the exit of the remote examination dedicated lane L1, and the simple immigration examination is simpler than the immigration examination in the examination booth B installed at the exit of the normal lane L2. In such a case, by performing a remote examination as a preliminary examination for an examiner face-to-face immigration examination and using a result of the preliminary examination in the examiner face-to-face immigration examination, it is possible to simplify the examiner face-to-face immigration examination.

Further, although the case where the remote examination terminal 10, the guiding apparatus 40, the signage terminal 50, and the automated gate apparatus 60 acquire a face image or a fingerprint image as biometric information on the user U has been described as an example in the above example embodiments, the present invention is not limited thereto. Each of the remote examination terminal 10, the guiding apparatus 40, the signage terminal 50, and the automated gate apparatus 60 may be a terminal or an apparatus that acquires another biometric information such as an iris image, a finger vein image, a palm image, a palm vein image, or the like as biometric information on the user U.

Further, with respect to the content of the present invention, when application to a country requiring no departure examination is expected, the term "departure examination" can be replaced with the term "security examination" in this specification.

Further, the remote examination terminal 10 according to the example embodiments described above can be configured as a system including one or a plurality of apparatuses. The examination server 20 according to the example embodiments described above can be configured as a system including one or a plurality of apparatuses. Further, the guiding apparatus 40 according to the example embodiments described above can be configured as a system including one or a plurality of apparatuses. Further, the signage terminal 50 according to the example embodiments described above can be configured as a system including one or a plurality of apparatuses. Further, the automated gate apparatus 60 according to the example embodiments described above can be configured as a system including one or a plurality of apparatuses.

Further, the scope of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a Compact Disc-Read Only Memory (CD-ROM), a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising: an examination unit that, based on user information acquired from a user who completed a departure examination of a first country but has not started boarding for a second country and related to the user, performs an immigration examination of the second country; and a transmission unit that transmits a notification related to the immigration examination.

(Supplementary Note 2)

The information processing apparatus according to supplementary note 1, wherein the transmission unit transmits, as the notification related to the immigration examination, a notification indicating that the immigration examination is completed or that the immigration examination has not been performed.

(Supplementary Note 3)

The information processing apparatus according to supplementary note 1 or 2, wherein the transmission unit transmits the notification to a mobile terminal of the user, a projection apparatus configured to project a content of the notification, or a display terminal configured to display a content of the notification.

(Supplementary Note 4)

The information processing apparatus according to supplementary note 3, wherein the transmission unit transmits the notification to the mobile terminal in response to a request transmitted from the mobile terminal at a timing based on information related to a position of the mobile terminal or a timing that the mobile terminal is operated in association with entry to the second country.

(Supplementary Note 5)

The information processing apparatus according to supplementary note 3 or 4, wherein the transmission unit transmits the notification to the projection apparatus or the display terminal in response to a request transmitted from the projection apparatus or the display terminal that detects the user.

(Supplementary Note 6)

The information processing apparatus according to any one of supplementary notes 1 to 5, wherein the transmission unit transmits a result of the immigration examination to an automated gate apparatus that controls passage of the user in accordance with the result of the immigration examination.

(Supplementary Note 7)

The information processing apparatus according to supplementary note 6, wherein the transmission unit transmits a notification that guides the user who completed the immigration examination to the automated gate apparatus.

(Supplementary Note 8)

The information processing apparatus according to any one of supplementary notes 1 to 7 further comprising a subject determination unit that determines whether or not the user is a subject of the immigration examination that is based on the user information.

(Supplementary Note 9)

The information processing apparatus according to supplementary note 8, wherein based on passage history information on passage of the user to the second country, the subject determination unit determines whether or not the user is a subject of the immigration examination.

(Supplementary Note 10)

The information processing apparatus according to supplementary note 8 or 9, wherein based on a time period to time of the boarding of the user, an airline company used by the user who uses an airplane to travel to the second country, or a seat type in the airplane, the subject determination unit determines whether or not the user is a subject of the immigration examination.

(Supplementary Note 11)

The information processing apparatus according to any one of supplementary notes 8 to 10, wherein based on a prescribed number of subjects of the immigration examination, the subject determination unit determines whether or not the user is a subject of the immigration examination.

(Supplementary Note 12)

The information processing apparatus according to any one of supplementary notes 8 to 11, wherein the subject determination unit determines whether or not the user is a subject of the immigration examination in accordance with whether or not the user is a pre-registered user registered to use the immigration examination.

(Supplementary Note 13)

The information processing apparatus according to any one of supplementary notes 8 to 12, wherein the subject determination unit determines whether or not the user is a subject of the immigration examination in accordance with behavior of the user in an airport who travels from the airport of the first country to the second country.

(Supplementary Note 14)

An information processing method comprising: based on user information acquired from a user who completed a departure examination of a first country but has not started boarding for a second country and related to the user, performing an immigration examination of the second country; and transmitting a notification related to the immigration examination.

(Supplementary Note 15)

A storage medium storing a program that causes a computer to perform:

based on user information acquired from a user who completed a departure examination of a first country but has not started boarding for a second country and related to the user, performing an immigration examination of the second country; and transmitting a notification related to the immigration examination.

As described above, although the present invention has been described with reference to the example embodiments, the present invention is not limited to the example embodiments described above. Various modifications that may be understood by those skilled in the art can be made to the configuration or details of the present invention within the scope of the present invention.

This application is based upon and claims the benefit of priority from Japanese Patent Application No. 2018-244803, filed on Dec. 27, 2018, the disclosure of which is incorporated herein in its entirety by reference.

REFERENCE SIGNS LIST 1 information processing system
10 remote examination terminal
20 examination server
30 mobile terminal
40 guiding apparatus
50 signage terminal
60 automated gate apparatus
70, 80 monitoring camera

What is claimed is:

1. A display terminal comprising:
a camera;
a display;
a memory configured to store instructions; and
a processor configured to execute the instructions to:
control the camera to capture a face of a user who arrives at a second country to acquire second face information;
transmit the second face information to a server;
receive, from the server, determination information indicating whether the user is a subject of an automated gate based on the user information, the determination information obtained by identifying the user information based on the captured second face information and first face information that is pre-registered, and the user information acquired in association with first face information before the user arrives at the second country when the user travels from a first country to the second country; and
control the display to display a location of the automated gate to guide the user to the automated gate when the user is the subject of the automated gate, the controlling the display to display the location of the automated gate being triggered by the camera capturing the face of the user.

2. The display terminal according to claim 1, wherein the determination information is obtained based on matching of the user information with information of persons under surveillance.

3. The display terminal according to claim 2, wherein the user information includes the first face information registered in a passport and ID information.

4. The display terminal according to claim 1, wherein the determination information is obtained based on passage history of the user included in the user information.

5. The display terminal according to claim 1, wherein the first face information, ID information and passage history information registered in a passport of the user are acquired before the face is captured by the camera.

6. The display terminal according to claim 5, wherein the determination information is obtained based on the first face information, the ID information and the passage history information registered in the passport of the user and acquired before the face is captured.

7. The display terminal according to claim 1, wherein the user information is acquired in association with the first face information when the user stays in the first country.

8. The display terminal according to claim 1, wherein the processor is further configured to execute the instructions to:
receive a notification related to an immigration examination of the second country, the immigration examination of the second country performed based on the user information acquired from the user who completed a departure examination of the first country but has not started boarding for the second country.

9. The display terminal according to claim 8, wherein the processor is further configured to receive, as the notification related to the immigration examination, a notification indicating that the immigration examination is completed or that the immigration examination has not been performed.

10. The display terminal according to claim 8, wherein the processor is further configured to execute the instructions to transmit the notification to a projection apparatus configured to project a content of the notification.

11. The display terminal according to claim 8, wherein the processor is further configured to execute the instructions to transmit a result of the immigration examination to the automated gate that controls passage of the user in accordance with the result of the immigration examination.

12. The display terminal according to claim 11, wherein the processor is further configured to execute the instructions to control the display to display the notification that guides the user who completed the immigration examination to the automated gate.

13. The display terminal according to claim 8, wherein the notification is generated by determining whether or not the user is a subject of the immigration examination that is based on the user information.

14. The display terminal according to claim 13, wherein the notification is generated by determining whether or not the user is a subject of the immigration examination, based on a time period to time of the boarding of the user, an airline company used by the user who uses an airplane to travel to the second country, or a seat type in the airplane.

15. The display terminal according to claim 13, wherein the notification is generated by determining whether or not the user is a subject of the immigration examination, based on a prescribed number of subjects of the immigration examination.

16. The display terminal according to claim 13, wherein the notification is generated by determining whether or not the user is a subject of the immigration examination in accordance with whether or not the user is a pre-registered user registered to use the immigration examination.

17. The display terminal according to claim 13, wherein the notification is generated by determining whether or not the user is a subject of the immigration examination in accordance with behavior of the user in the airport who travels from an airport of the first country to the second country.

18. An information processing method comprising:

controlling a camera of a display terminal to capture a face of a user who arrives at a second country to acquire second face information;

transmitting the second face information to a server;

receiving, from the server, determination information indicating whether the user is a subject of an automated gate based on user information, the determination information obtained by identifying the user information based on the captured second face information and first face information that is pre-registered, and the user information acquired in association with first face information before the user arrives at the second country when the user travels from a first country to the second country; and controlling a display of the display terminal to display a location of the automated gate to guide the user to the automated gate when the user is the subject of the automated gate, the controlling the display to display the location of the automated gate being triggered by the camera capturing the face of the user.

19. A non-transitory storage medium storing a program that causes an information processing system to perform:

controlling a camera of a display terminal to capture a face of a user who arrives at a second country to acquire second face information;

transmitting the second face information to a server;

receiving, from the server, determination information indicating whether the user is a subject of an automated gate based on the user information, the determination information obtained by identifying the user information based on the captured second face information and first face information that is pre-registered, and the user information acquired in association with first face information before the user arrives at the second country when the user travels from a first country to the second country; and controlling a display of the display terminal to display a location of the automated gate to guide the user to the automated gate when the user is the subject of the automated gate, the controlling the display to display the location of the automated gate being triggered by the camera capturing the face of the user.

* * * * *